US012793127B2

(12) United States Patent
Jenvey et al.

(10) Patent No.: US 12,793,127 B2
(45) Date of Patent: *Nov. 10, 2026

(54) SYSTEM AND METHOD FOR ASSESSING RISK LEVEL OF TRANSACTIONS BASED ON ROUTING NUMBER

(71) Applicant: Actimize LTD., Ra'anana (IL)

(72) Inventors: Edward Jenvey, Mountain View, CA (US); Ralph Lao, San Jose, CA (US)

(73) Assignee: Actimize Ltd., Ra'anana (IL)

( * ) Notice: Subject to any disclaimer, the term of this patent is extended or adjusted under 35 U.S.C. 154(b) by 134 days.

This patent is subject to a terminal disclaimer.

(21) Appl. No.: 18/308,165

(22) Filed: Apr. 27, 2023

(65) Prior Publication Data

US 2024/0362703 A1 Oct. 31, 2024

(51) Int. Cl.

*G06Q 40/02* (2023.01)
*G06Q 20/10* (2012.01)
*G06Q 20/40* (2012.01)

(52) U.S. Cl.

CPC ........... *G06Q 40/02* (2013.01); *G06Q 20/108* (2013.01); *G06Q 20/4015* (2020.05)

(58) Field of Classification Search

CPC .. G06Q 40/02; G06Q 20/4015; G06Q 20/108; G06Q 20/401; G06Q 20/40; G06Q 20/4016; G06Q 20/382; G06Q 20/023; G06Q 20/4014; G06Q 10/0635; G06Q 40/0225; G06Q 40/024; G06Q 30/0205

See application file for complete search history.

(56) References Cited

U.S. PATENT DOCUMENTS 8,527,418 B2 * 9/2013 Enzaldo ................. G06Q 20/10 705/35
10,290,053 B2 * 5/2019 Priess .................. G06Q 50/265
11,023,866 B2 * 6/2021 Peace ................... G06Q 20/023
2005/0144131 A1 * 6/2005 Aziz .................... G06Q 20/108 705/45

(Continued)

OTHER PUBLICATIONS

"Towards Artificial Intelligence Enabled Financial Crime Detection," Zeinab Rouhollahi, Macquarie University, Sydney, Australia, arXiv:2105.10866v1 [cs.LG] May 23, 2021 (Year: 2021).*

(Continued)

*Primary Examiner* — Ryan D Donlon
*Assistant Examiner* — Steven R Chism

(57) ABSTRACT

A system determines a transaction's risk level from the routing number. The system includes a processor, a list of routing numbers and a group of transactions. Each transaction includes a dollar amount, a sender, and a routing number of a receiving institution. For each respective routing number, based on the transactions, the processor determines a transaction volume of the routing number and a probability of a legitimate transaction from the routing number to other routing numbers on the list. For each other routing number on the list, based on the transaction volume of the routing number, the processor determines risk curves for transactions from the sender to the routing number based on dollar amount and relative probability of legitimate transactions being sent from the sender to the other routing number. For a new transaction from the sender, a risk score is computed based on its dollar amount and routing number.

20 Claims, 17 Drawing Sheets

(56) References Cited

U.S. PATENT DOCUMENTS

| | | | | |
|---|---|---|---|---|
| 2006/0229961 A1* | 10/2006 | Lyftogt | G06Q 20/108 | 707/999.1 |
| 2012/0109821 A1* | 5/2012 | Barbour | G06Q 40/02 | 705/44 |
| 2012/0239557 A1* | 9/2012 | Weinflash | G06Q 40/02 | 705/39 |
| 2015/0026027 A1* | 1/2015 | Priess | G06Q 10/04 | 705/35 |

OTHER PUBLICATIONS

Clearing House Electronic Check Clearing System ("CHECCS") Operating Rules; An IP.com Prior Art Database Technical Disclosure; Authors et. al.: Disclosed Without Attribution; Authors et. al.: Undisclosed; Original Pub Date: Jan. 1, 2011 IP.com No. IPCOM000242148D; Pub Date: Jun. 19, 2015 (Year: 2015).*

* cited by examiner

Calculating Relative Probability for a Specific Tenant Bank

SYSTEM AND METHOD FOR ASSESSING RISK LEVEL OF TRANSACTIONS BASED ON ROUTING NUMBER

COPYRIGHT NOTICE

A portion of the disclosure of this patent document contains material which is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

TECHNICAL FIELD

The subject matter described herein relates to systems and methods for assessing the risk level of a transaction or group of transactions based on the American Bankers Association (ABA) routing number of the receiving institution. This ABA risk assessment system has particular but not exclusive utility for fraud detection in automated clearing house (ACH) fund transfer transactions.

BACKGROUND

Financial institutions can exchange funds through a system known as the automated clearinghouse network (ACH), often by using a financial product called automated clearinghouse originating depository financial institution (ACH ODFI) or receiving depository financial institution (ACH RDFI). ACH requires both the sending and receiving institutions to have an identifying number called an American Bankers Association (ABA) routing number, often referred to simply as the institution's ABA. Each bank or other financial institution has at least one ABA number, and larger banks (e.g., Bank of America, Citibank) may have a different ABA for every U.S. state. Financial institutions can suffer from a type of fraud known as business email compromise (BEC), wherein a fraudster impersonates a vendor, contacts a company (usually by email), and convinces the company that the vendor has changed their banking information. When the company receives an invoice, this fraudulent banking information can trick the company into sending a legitimate payment to the wrong account number, such that the fraudster receives the payment and the legitimate vendor does not.

Some cases of BEC are detectable by current systems. For example, if a given company has a history of sending money to another company, a sudden change to the receiving account number might trigger an alert. However, other forms of BEC fraud are much harder to detect. Examples include a first payment to a given vendor, or a first ACH payment to the vendor, where previous payments were made by check. In another example, the payee could be a person (or a company name that looks like a person). Since people change their account numbers more frequently than businesses do, a sudden change in recipient account number might not appear suspicious. Numerous other BEC examples exist that are similarly extremely difficult to detect.

The incidence of such BEC fraud is increasing. Thus, it appears there is a need for increased fraud detection particular to BEC-type fraud.

The information included in this Background section of the specification, including any references cited herein and any description or discussion thereof, is included for technical reference purposes only and is not to be regarded as subject matter by which the scope of the disclosure is to be bound.

SUMMARY

Disclosed is an ABA risk assessment system and methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system adapted to automatically determine a risk level of a transaction based on the transaction's routing number. The system includes a processor and a non-transitory computer readable medium operably coupled thereto, the computer readable medium may include a plurality of instructions stored in association therewith that are accessible to, and executable by, the processor, to perform operations. The operations may for example include receiving a list of routing numbers, each associated with a respective institution of a plurality of institutions; receiving a first group of transactions, where each transaction of the first group of transactions may include a dollar amount, a respective sending institution from the plurality of institutions, and a respective routing number of a receiving institution from the list of routing numbers, and where some transactions of the first group of transactions are legitimate and some transactions of the first group of transactions are fraudulent. The operations may also include: for each respective routing number on the list of routing numbers, based on the legitimate transactions of the first group of transactions: determining a transaction volume associated with the routing number; determining a relative probability of a legitimate transaction being sent from the respective institution to other routing numbers on the list of routing numbers; and for each of the respective other routing numbers on the list of routing numbers, based on the transaction volume associated with of the respective other routing number, determining a risk curve for transactions from the respective institution to the respective other routing number based on a dollar amount and the relative probability of a legitimate transaction being sent from the respective institution to the respective other routing number, such that for a new transaction from the respective institution, a risk score can be computed based on a dollar amount and routing number of the new transaction. The system also includes receiving a real-time transaction; computing a risk score for the real-time transaction based on a dollar amount of the real-time transaction and the risk curve for transactions from a sending routing number of the real-time transaction to a receiving routing number of the real-time transaction; and if the risk score exceeds a threshold value, generating an alert for the real-time transaction. Other embodiments of this aspect include corresponding computer systems, apparatus, and computer programs recorded on one or more computer storage devices, each configured to perform the actions of the methods.

Implementations may include one or more of the following features. In some embodiments, the operations may further include: for each routing number on the list of routing numbers, based at least on the legitimate transactions of the first group of transactions, determining a geographic region of the routing number; and treating each routing number on the list of routing numbers as a sending institution and each other routing number on the list of routing numbers as a receiving institution: for each receiving institution, based on the transaction volume associated with the receiving institution and the geographic region of the receiving institution, determining the risk curve for transactions from that sending institution to the receiving institution based on dollar amount and the relative probability of a legitimate transaction being sent from that sending institution to that receiving institution. In some embodiments, the operations further may include: receiving a second group of transactions; and for each routing number on the list of routing numbers, based on legitimate transactions of the second group of transactions, updating the transaction volume associated with the routing number; treating each routing number on the list of routing numbers as a sending institution and each other routing number on the list of routing numbers as a receiving institution: updating the relative probability of a legitimate transaction being sent from that sending institution to each receiving institution; and for each receiving institution, based on the transaction volume associated with the receiving institution, updating the risk curve for transactions from that sending institution to the receiving institution based on dollar amount and the relative probability of a legitimate transaction being sent from that sending institution to that receiving institution. In some embodiments, the transaction volume associated with each routing number of the plurality of routing numbers is selected from a group may include of small, medium, and large. In some embodiments, each transaction of the first group of transactions further may include a flag indicating whether the transaction is a payroll transaction or a non-payroll transaction, and where the risk curves are determined separately for payroll transactions and non-payroll transactions. In some embodiments, the operations further may include generating the alert if the routing number of the real-time transaction does not appear on the list of routing numbers. In some embodiments, the operations further may include generating the alert only if the relative probability of a legitimate transaction being sent from the sending routing number of the real-time transaction to the receiving routing number of the real-time transaction falls below a threshold value. In some embodiments, the real-time transaction is part of a plurality of transactions from the same sending institution to the same receiving institution, and an alert generated for the real-time transaction indicates a risk level of the plurality of transactions. In some embodiments, if the real-time transaction is fraudulent, the performing of the operations by the processor improves a probability of a fraud detection system detecting that the real-time transaction is fraudulent. In some embodiments, the operations further may include, for each transaction in the first group of transactions, if the transaction is known to be fraudulent, issuing a hold or warning message for the transaction. Implementations of the described techniques may include hardware, a method or process, or computer software on a computer-accessible medium.

One general aspect includes a computer-implemented method adapted to automatically determine a risk level of a transaction based on the transaction's routing number. The computer-implemented method includes receiving a list of routing numbers, each associated with a respective institution of a plurality of institutions; receiving a first group of transactions, where each transaction of the first group of transactions may include a dollar amount, a respective sending institution from the plurality of institutions, and a respective routing number of a receiving institution from the list of routing numbers, where some transactions of the first group of transactions are legitimate and some transactions of the first group of transactions are fraudulent. The method also includes, for each respective routing number on the list of routing numbers, based on the legitimate transactions of the first group of transactions, determining a transaction volume associated with the routing number. The method also includes determining a relative probability of a legitimate transaction being sent from the respective routing number to other routing numbers on the list of routing numbers; and, for each of the respective other routing numbers on the list of routing numbers, based on the transaction volume associated with of the respective other routing number, determining a risk curve for transactions from the respective routing number to the respective other routing number based on a dollar amount and the relative probability of a legitimate transaction being sent from the respective routing number to the respective other routing number, such that for a new transaction from the respective routing number, a risk score can be computed based on a dollar amount and routing number of the new transaction. The method also includes receiving a real-time transaction; computing a risk score for the real-time transaction based on a dollar amount of the real-time transaction and the risk curve for transactions from a sending routing number of the real-time transaction to a receiving routing number of the real-time transaction. The method also includes, if the risk score exceeds a threshold value, generating an alert for the real-time transaction. Other embodiments of this aspect include corresponding computer systems, apparatus, and computer programs recorded on one or more computer storage devices, each configured to perform the actions of the methods.

Implementations may include one or more of the following features. In some embodiments, the method may further may include: for each routing number on the list of routing numbers, based at least on the legitimate transactions of the first group of transactions, determining a geographic region of the institution associated with the routing number; and treating each routing number on the list of routing numbers as a sending institution and each other routing number on the list of routing numbers as a receiving institution; for each receiving institution, based on the transaction volume associated with the receiving institution and the geographic region of the receiving institution, determining the risk curve for transactions from that sending institution to the receiving institution based on dollar amount and the relative probability of a legitimate transaction being sent from that sending institution to that receiving institution. In some embodiments, the method may further include: receiving a second group of transactions; and for each routing number on the list of routing numbers, based on legitimate transactions of the second group of transactions, updating the transaction volume associated with the routing number; treating each routing number on the list of routing numbers as a sending institution and each other routing number on the list of routing numbers as a receiving institution: updating the relative probability of a legitimate transaction being sent from that sending institution to each receiving institution; and for each receiving institution, based on the transaction volume associated with the receiving institution, updating the risk curve for transactions from that sending institution to the receiving institution based on dollar amount and the relative probability of a legitimate transaction being sent from that sending institution to that receiving institution. In some embodiments, the transaction volume associated with each routing number on the list of routing numbers is selected from the group including: small, medium, and large.

In some embodiments, each transaction of the first group of transactions is further selected to may include a flag indicating whether the transaction is a payroll transaction or a non-payroll transaction, and where the determining of the risk curves is conducted separately for payroll transactions and non-payroll transactions. In some embodiments, the method which further may include generating the alert if the routing number of the real-time transaction does not appear on the list of routing numbers. In some embodiments, the method may further include generating the alert only if the relative probability of a legitimate transaction being sent from the sending routing number of the real-time transaction to the receiving routing number of the real-time transaction falls below a threshold value. In some embodiments, the real-time transaction is selected from part of a plurality of transactions from the same sending routing number to the same receiving routing number, and an alert generated for the real-time transaction indicates a risk level of the plurality of transactions. In some embodiments, if the real-time transaction is fraudulent, the method improves a probability of a fraud detection system detecting that the real-time transaction is fraudulent. In some embodiments, the method may further include, for each transaction in the first group of transactions, if the transaction is known to be fraudulent, issuing a hold or warning message for the transaction. Implementations of the described techniques may include hardware, a method or process, or computer software on a computer-accessible medium.

The ABA risk assessment system disclosed herein has particular, but not exclusive, utility for detecting BEC fraud within the United States banking system.

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the ABA risk assessment system, as defined in the claims, is provided in the following written description of various embodiments of the disclosure and illustrated in the accompanying drawings.

BRIEF DESCRIPTION OF THE DRAWINGS

Illustrative embodiments of the present disclosure will be described with reference to the accompanying drawings, of which.

DETAILED DESCRIPTION

Figure 1:
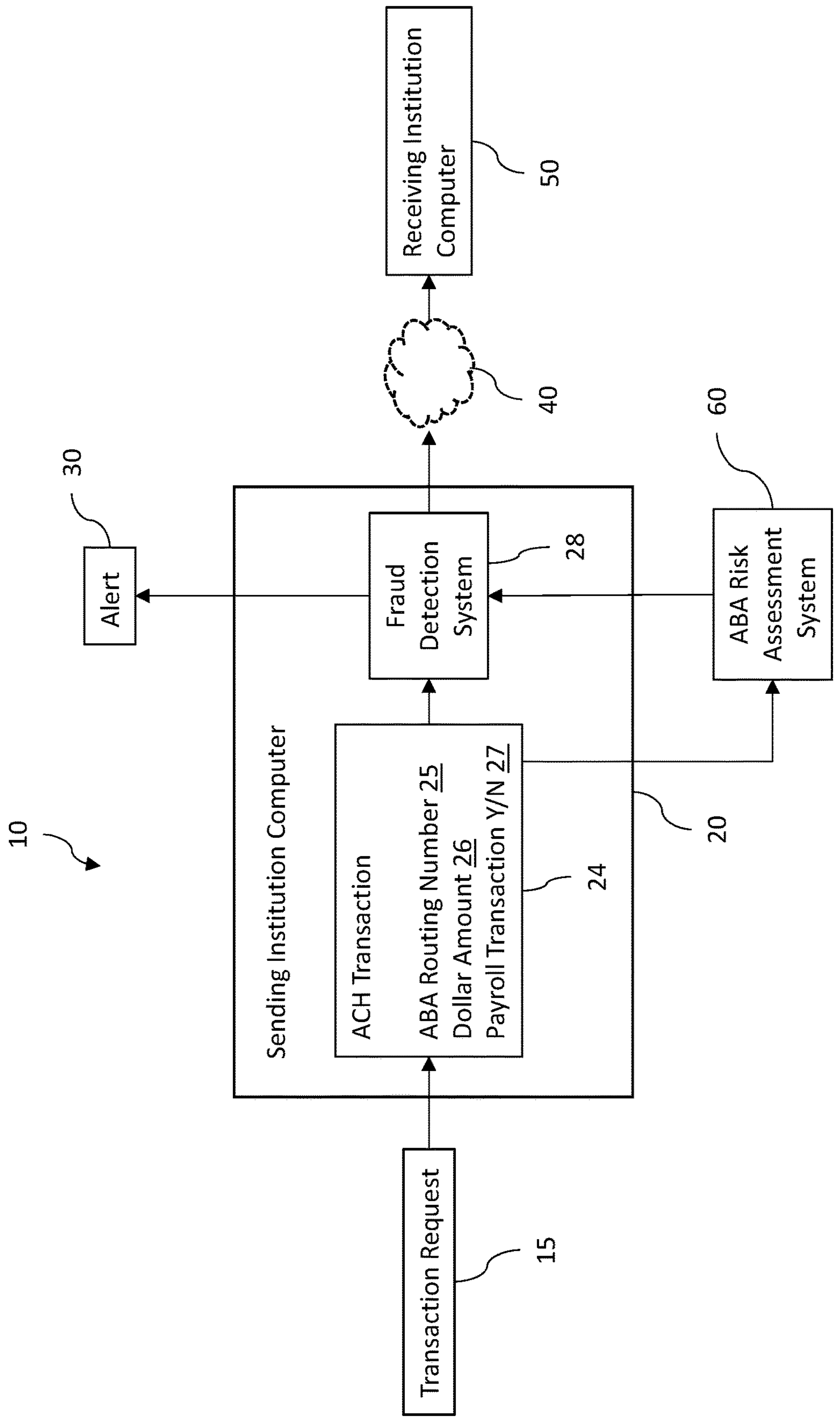
FIG. 1 is a schematic, diagrammatic representation, in block diagram form, of at least a portion of an example automated clearing house (ACH) funds transfer system, in accordance with at least one embodiment of the present disclosure.

In accordance with at least one embodiment of the present disclosure, an ABA risk assessment system and methods are provided that can flag BEC fraud transactions as suspicious.

Sending institutions often employ fraud detection systems that analyze signals, e.g., different variables associated with the transaction. Based on these signals, when an outgoing transaction appears suspicious, the sending institution may issue an alert (e.g., a hold or warning message) on the transaction until the validity or invalidity of the transaction can be confirmed (e.g., by a human fraud analyst). However, BEC fraud can be extremely difficult for the sending financial institution to detect, because in this case, all the information about the payment is correct except for the recipient account number and ABA. If there are previous transactions in the ODFI channel between the customer and this counter party, the observed change in account information can often—although not always—be enough to indicate fraud. If there are no previous transactions in the ODFI channel, then there is virtually no way to detect the fraud.

Previous systems have included an ABA blacklist, such that ABAs associated with past fraud can be flagged as suspicious. However, for a first-time BEC fraud, or any fraud in which the receiving institution has not yet been blacklisted, such blacklists may not be useful. The present disclosure provides systems, methods, and devices for measuring the unusualness of the ABA for the given tenant bank (e.g., how likely the tenant bank is to send funds to that ABA), thus enabling potential detection of BEC frauds that were previously virtually uncatchable.

The ABA risk assessment system of the present disclosure uses conditional probabilities to assess the ABA of the counter party or receiving institution, to determine the extent to which it is unusual and hence risky. The ABA risk assessment system improves on present fraud detection technology by allowing the system to use and analyze data that was previously not used. The ABA risk assessment system estimates the likelihood of transactions between a tenant bank and any other bank by using the distribution of all transactions between all tenant banks (e.g., all banks employing the ABA risk assessment system) and any other U.S. financial institution. Although the present disclosure is directed in particular to financial institutions in the United States, it is noted that the ABA risk assessment system can be used for financial institutions in other countries, or across multiple countries, or globally, although of course the ABA risk and ABA number may be substituted for the appropriate terminology and financial institution identification number applicable to any particular country or jurisdiction, or type of financial institution.

With the ABA risk assessment system of the present disclosure, it becomes possible to evaluate the risk of a transaction using the ABA routing number, even if all other signals are valid. The ABA risk assessment system uses an ABA routing number information database (e.g., built by data scientists, an engineering team, and/or automated systems incorporated into the ABA risk management system) to evaluate risk in payment transactions. The banks accessible for transfers by a given financial institution may be referred to as the universe of that financial institution. Instead of directly measuring the likelihood of one bank sending money to another bank, the ABA risk assessment system examines all banks in the universe of the sending institution to get a much clearer picture of what is and is not unusual, by using all available transaction data to measure the quantity and type of transactions from the tenant bank to every other ABA number and hence measure a strength of connection between these banks. Then, the ABA risk assessment system uses these strengths to estimate the relative likelihood of future transactions between the tenant bank and any other bank.

If the system monitors all channels of payments for the tenant bank and pools this information, and if there were previous payments in a different channel, then this can often be enough to alert one or more transactions as potentially fraudulent. However, there may be problems with depending on the transaction type as a signal. For example, the present disclosure may have some, but limited, value in identifying whether the transaction was a payroll payment. Payroll transactions have a very different expected distribution of account changes—and hence a solution that did not take into account whether the transaction were a payroll payment would be suboptimal. Additionally, ACH transactions are based on a company_id (often times a tax id) and not an account number. This means any cross-channel solution requires matching company_id with company account number—and this typically proves challenging. Furthermore, if there are no previous transactions with this counter party, monitoring other channels would not help.

The ABA risk assessment system can measure the unusualness of a counter party ABA given the tenant bank. Essentially, the customers of a bank are more likely to interact with certain banks—usually ones that are close geographically, or that, for some other reason, are common counter party banks. On the other hand, fraudsters will set up shop where they can. There is little reason to think that fraudsters will only try to defraud customers at banks that do significant business with their own bank, particularly since many fraudsters deliberately set up remote operations to attempt to evade legal requirements.

The ABA risk assessment system measures the relative likelihood of the tenant bank to interact with every other bank in its universe. If the likelihood is calculated to be small (e.g., below a threshold probability), then an alert can be generated on the transaction. This solution does not require monitoring any other channel-simply monitoring the ACH ODFI channel. Additionally, it measures the likeliness of a given counter-party bank. This means that given knowledge of a change in account information, the system can perform another test—whether the new counter-party bank is deemed unlikely. Thus, the ABA risk assessment system provides a novel way of using information available to the fraud detection system. Typically, a risk assessment evaluates the information of the tenant bank and what the customer has done. This present method uses information from all customer banks and estimates the relatively likelihood of transactions between the tenant bank and every other bank in its universe (e.g., the United States, or another country, or all tenant banks of a particular fraud detection provider).

The ABA risk assessment system disclosed herein addresses the issue that, in existing fraud detection systems, there is simply no way to detect or alert certain common types of fraud. The ABA risk assessment system can look at all ACH data at all tenant banks to calculate the probability of two banks doing business and then normalize these probabilities. Indeed, a small local bank may have very few transactions with a large tenant bank, without these few transactions being suspicious. The ABA risk assessment system can thus improve the fraud detection system's fraud detection rate, while lowering the number of false positives. Additionally, the system and methods disclosed herein can be used in other products and systems, e.g., those which may be useful in satisfying Rule 314(b) of the US Patriot Act or other jurisdictional legal compliance requirements.

The present disclosure aids substantially in fraud detection, by improving the fraud detection system's ability to identify BEC fraud based on the ABA routing number of the receiving institution. Implemented on a computing system in communication with an ACH network and a database of ACH network traffic, the ABA risk assessment system disclosed herein provides practical, actionable alerts to fraud analysts. This improved fraud detection capability transforms a process of blacklisting suspicious ABA numbers after the fact into a robust, predictive process that assesses the risk of a transaction before it is executed. This occurs without the normally routine need to absorb losses from BEC fraud until a clear pattern of fraudulent traffic to a particular ABA has been established. This unconventional approach advantageously improves the efficient functioning of a fraud detection computing system, by providing access to new data and new patterns that were previously unavailable for fraud detection, thus reducing not only financial losses but also the amount of time, computing power, and associated human labor required to detect a fraud and to address the consequences of a successful fraudulent transaction.

The ABA risk assessment system may be implemented as a process at least partially viewable on a display, and operated by a control process executing on a processor that accepts user inputs from a keyboard, mouse, or touchscreen interface, and that is in communication with one or more networks and databases. In that regard, the control process performs certain specific operations in response to different inputs or selections made at different times. Outputs of the ABA risk assessment system may be printed, shown on a display, or otherwise communicated to human operators. Certain structures, functions, and operations of the processor, display, sensors, and user input systems are known in the art, while others are recited herein to enable novel features or aspects of the present disclosure with particularity.

These descriptions are provided for exemplary purposes only, and should not be considered to limit the scope or usefulness of the present ABA risk assessment systems and methods. Certain features may be added, removed, or modified without departing from the spirit of the claimed subject matter.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one of ordinary skill in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

FIG. 1 is a schematic, diagrammatic representation, in block diagram form, of at least a portion of an example automated clearing house (ACH) funds transfer system 10, in accordance with at least one embodiment of the present disclosure. In the example shown in FIG. 1, the ACH funds transfer system 10 includes a transaction request 15 that is received by a sending institution computer 20. The transaction request 15 is translated into an ACH transaction which includes multiple features or variables, including at least an ABA routing number 25, a dollar amount 26, and a flag 27 indicating whether the transaction is a payroll transaction. The ACH transaction 24 is passed to a fraud detection system 28 which analyzes the variables or signals 25, 26, 27. If the variables or signals 25, 26, 27 are calculated to be suspicious, the fraud detection system 28 issues an alert 30. If the variables or signals 25, 26, 27 are calculated not to be suspicious, the fraud detection system executes the transaction over a network 40 (e.g., the Internet), thus transferring the dollar amount 26 to a receiving institution computer 50.

In accordance with the present disclosure, an ABA risk assessment system 60 may be added to the fraud detection system 28, in order to enable the fraud detection system 28 to detect frauds that may otherwise be undetectable.

It is noted that block diagrams are provided herein for exemplary purposes; a person of ordinary skill in the art will recognize myriad variations that nonetheless fall within the scope of the present disclosure. For example, block diagrams may show a particular arrangement of components, modules, services, steps, processes, or layers, resulting in a particular data flow. It is understood that some embodiments of the systems disclosed herein may include additional components, that some components shown may be absent from some embodiments, and that the arrangement of components may be different than shown, resulting in different data flows while still performing the methods described herein, without departing from the spirit and scope of the present disclosure.

Figure 2:
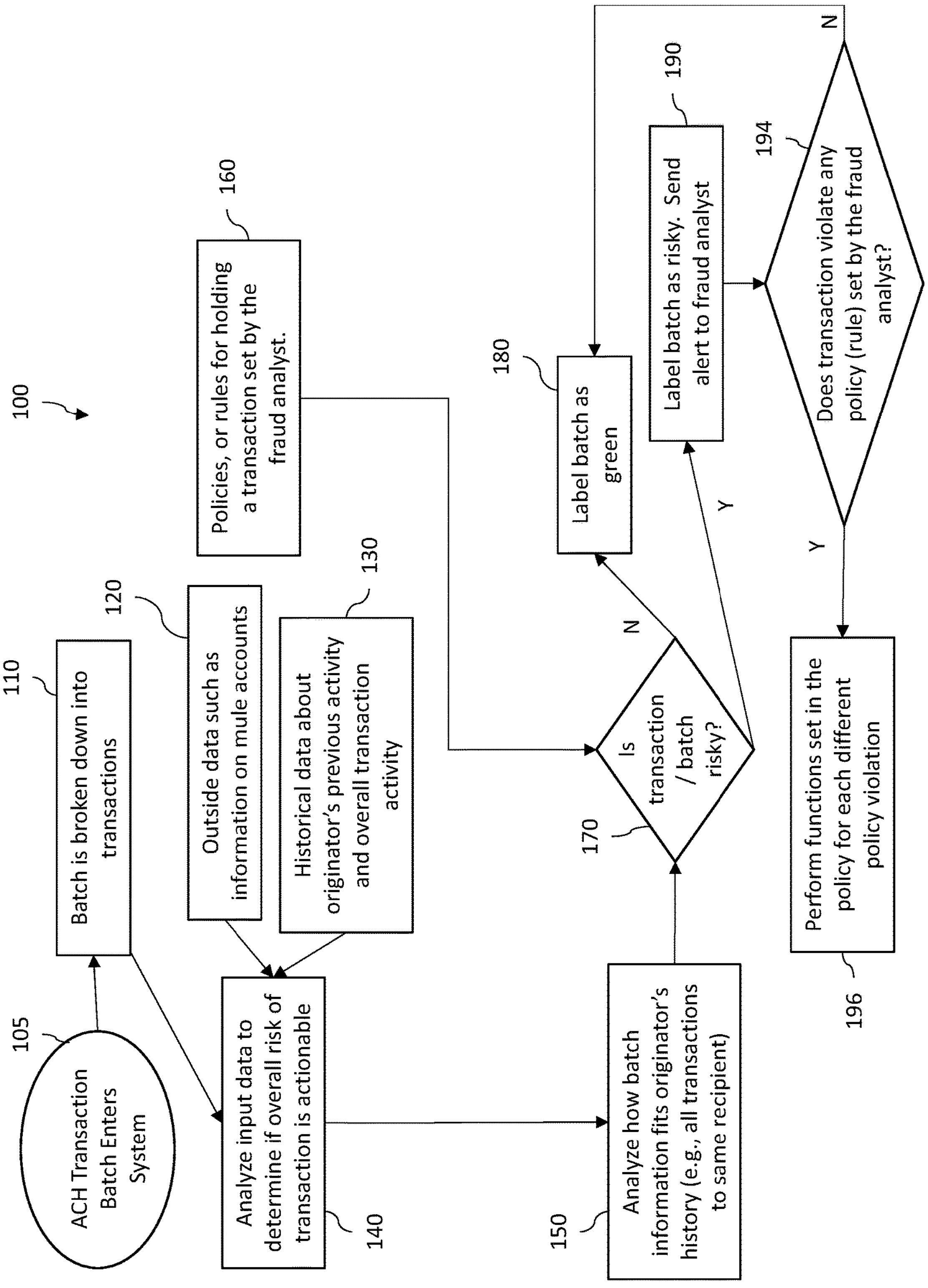
FIG. 2 is a schematic, diagrammatic representation, in hybrid flow diagram and block diagram form, of at least a portion of an example fraud detection method, in accordance with at least one embodiment of the present disclosure.

FIG. 2 is a schematic, diagrammatic representation, in hybrid flow diagram and block diagram form, of at least a portion of an example fraud detection method 100, in accordance with at least one embodiment of the present disclosure. It is understood that the steps of the method 100 may occur be performed in a different order than shown in FIG. 2, additional steps can be provided before, during, and after the steps, and/or some of the steps described can be replaced or eliminated in other embodiments. One or more of steps of the method 100 can be carried by one or more devices and/or systems described herein, such as components of the ACH system 10, sending institution computer 20, receiving institution computer 50, fraud detection system 28, and/or processor circuit 1750.

In step 105, the method 100 includes receiving a batch of ACH transactions, each of which includes features or variables such as a dollar amount, a payroll flag, and an ABA routing number of the receiving institution. Execution them proceeds to step 110.

In step 110, the method 100 includes breaking the batch down into individual transactions. Execution them proceeds to step 140.

In step 140, the method 100 includes selecting the next transaction from the batch and, for the current transaction, analyzing the features or variables of the transaction to determine the overall risk of the transaction (e.g., by computing an overall risk score). This analysis incorporates outside data 120, which may for example include information on known mule accounts, and historical data 130, which may for example include data about the originating institution's previous activity and overall transaction activity. Execution them proceeds to step 150.

In step 150, the method 100 includes analyzing how the batch information compares against the history of the originator (e.g., the sending institution). This analysis may for example involve looking at the variables or features of all transactions sent to the same recipient, to determine a history risk score. Execution then proceeds to step 170.

In step 170, the method 100 includes determining whether the batch (or a transaction within the batch) is risky, e.g., whether a computed risk score exceeds the threshold value. which may for example be limits, ranges, triggers, or conditionals for the risk scores or other signals that have been set by a human fraud analyst and stored within a memory of the sending institution computer 20 or fraud detection system 28. If no, execution proceeds to step 180. If yes, execution proceeds to step 190.

In step 180, the method 100 includes labeling the batch as green, e.g., non-fraudulent or non-suspect, and processing the batch as previously or currently requested, e.g., by transmitting the batch of payments. The method 100 is now complete.

In step 190, the method 100 includes labeling the batch of transactions as risky, and sending an appropriate alert to a fraud analyst. Execution then proceeds to step 194.

In step 194, the method 100 includes determining whether the transaction violates any of the policies or rules set by the fraud analyst. If yes, execution proceeds to step 196. If no, execution proceeds to step 180.

In step 196, the method 100 includes performing the actions or functions set in each of the violated policies, for each of the violating transactions. One such action might, for example, including notifying one or more other parties such as the other institution, or the regulatory or law enforcement authorities. The method 100 is now complete.

It is noted that flow diagrams are provided herein for exemplary purposes; a person of ordinary skill in the art will recognize myriad variations that nonetheless fall within the scope of the present disclosure. For example, the logic of flow diagrams may be shown as sequential. However, similar logic could be parallel, massively parallel, object oriented, real-time, event-driven, cellular automaton, or otherwise, while accomplishing the same or similar functions. In order to perform the methods described herein, a processor may divide each of the steps described herein into a plurality of machine instructions, and may execute these instructions at the rate of several hundred, several thousand, several million, or several billion per second, in a single processor or across a plurality of processors. Such rapid execution may be necessary in order to execute the method in real time or near-real time as described herein. For example, computing the probability of a given tenant bank sending money to any other given receiving bank may involve a multivariate analysis with as many dimensions as there are financial institutions in the tenant bank's universe, resulting in potentially millions or billions of probability calculations as described below. Furthermore, given the dynamic nature of the financial world, and of financial fraud, these probabilities may be in constant flux, such that new values need to be computed on a weekly, monthly, or yearly basis.

Figure 3:
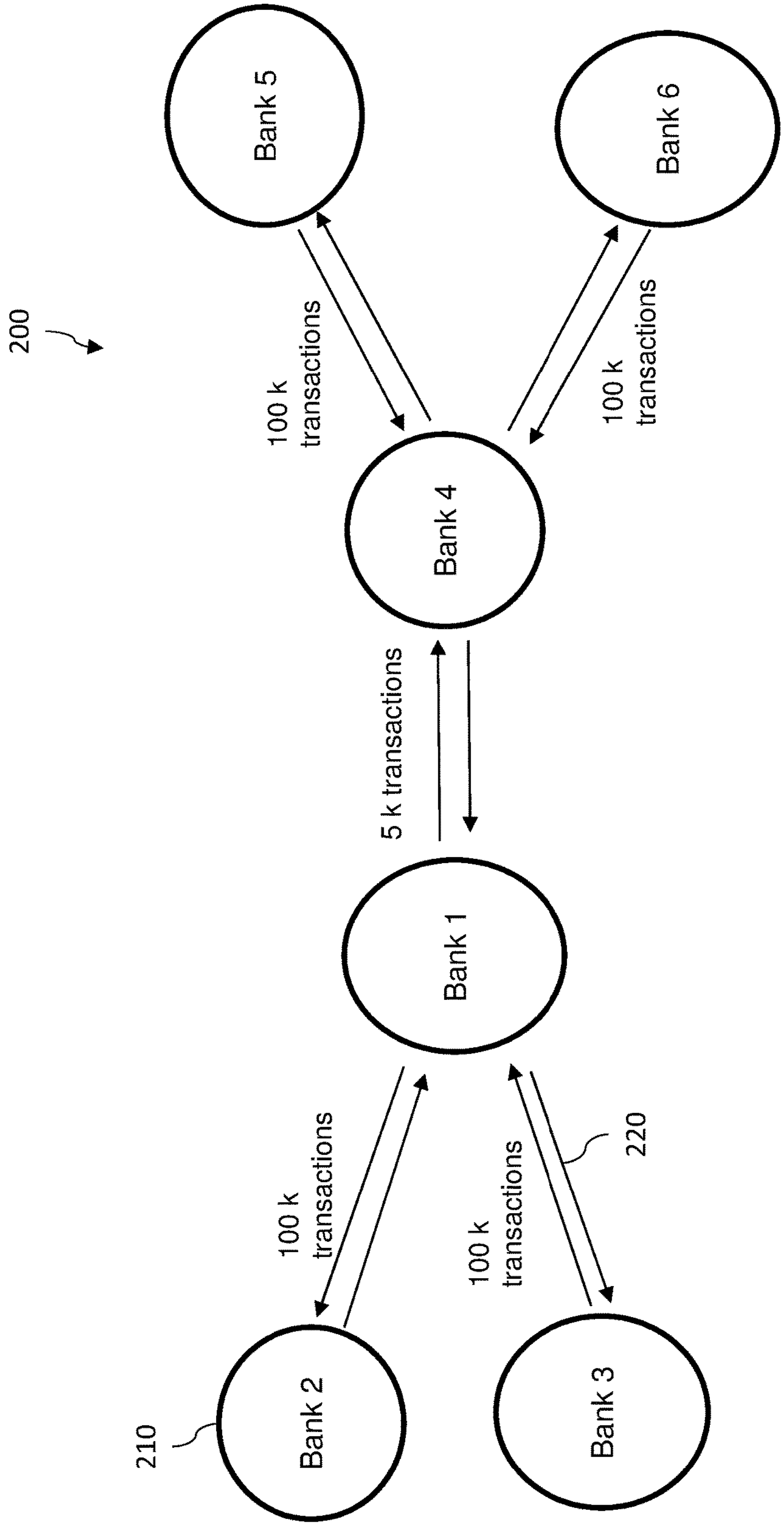
FIG. 3 is a schematic, diagrammatic representation of transaction traffic between six different financial institutions, in accordance with at least one embodiment of the present disclosure.

FIG. 3 is a schematic, diagrammatic representation of transaction traffic between six different financial institutions 210, in accordance with at least one embodiment of the present disclosure. In this example, Banks 2 and 3 do a lot of business with Bank 1 (e.g., each one does a total of approximately 100,000 transactions 220 over a time period such as one month), and Banks 5 and 6 do a lot of business with Bank 4 (e.g., each one does a total of approximately 100,000 transactions 220). Bank 1 and Bank 4 do a smaller volume of business with one another, totaling approximately 5,000 transactions. Within the measured time period (e.g., one month), Banks 2, 3, 5, and 6 do not do any business with one another at all (e.g., zero transactions). Thus, a transaction between Bank 2 and Bank 1 is roughly 20× more probable than a transaction between Bank 1 and Bank 4, while a transaction between Bank 2 and Bank 3 should be considered much less likely than either of these. Furthermore, if Banks 103 are in a different geographic region than Banks 4-6, then a transaction between Bank 2 and Bank 5 may be considered even less likely than a transaction between Bank 2 and Bank 3. Thus, recent historical transaction data between a tenant bank and the universe of potential receiving banks can provide significant information about the likelihood of any given future transaction between that tenant bank and a particular receiving bank.

The ABA risk assessment system may add new tenant banks through a pre-processing step. For initial setup, the system may use transaction data for a few different banks of at least mid-size bank. In an example, transaction data from 50 banks may be used. For each tenant bank, the system records the amounts, the directions of the transaction, the account, and ABA numbers for both originator and recipient. It may also be advantageous to record a flag for each transaction indicating whether or not it is a payroll transaction. This data can exist in raw National Automated Clearing House Association (NACHA) files, or in a production database as the result of a live running model.

The pre-processing as depicted includes the following: Find the connection strength between banks; Cluster banks by size (e.g., transaction volume); Cluster banks by geolocation; calculate a connection strength between a tenant bank and each bank in its universe; for a fixed tenant bank and a fixed size group on the universe of banks, create a risk curve as a function of amount and the connection strength; and Find the connection strength between banks. The starting point is raw data that provides information about the amount, direction and account numbers/ABA numbers for each transaction.

It is noted that the present disclosure sometimes uses the words “ABA”, “ABA routing number”, “financial institution”, and “bank” interchangeably. However, this is not always a 1-1 correspondence. Big banks can have many ABA numbers—the bigger banks can have a different ABA in each state. Indeed, for ACH, an ABA represents a bank in a certain geo-location. For example, it could be Chase in Florida or Bank of America in California.

A number of tables may be created during this process. For the most part, these tables may be used during the pre-processing steps as described herein. The tables Relative Strength Tenant Banks (for the tenant bank in question) and ABA Size are needed during model runtime, although it is certainly possible to combine them into one lookup table.

If combined, an example row or record format of this table is as follows: Originator ABA. Recipient ABA Relative strength of connection Size of recipient ABA. This table is used during runtime as a lookup to get the unusualness of the ABA and the associated risk is then determined by the model. If the analysis is for a redeploy/upgrade to an existing customer, new data may be needed to understand the typical amounts and counter party (e.g., recipient) banks this tenant is now using. This may be considered part of the typical model tuning process.

If the analysis is for a new customer, this new transaction data may need to be added to the ABA risk assessment system's universe of ODFI transaction data, and the pre-processing may need to be repeated.

Thus, the output of the pre-processing step is essentially a lookup table to find the unusualness and size of a recipient bank, as novel inputs into the fraud detection model. The model's risk curves can then use that lookup, in addition to other information such as they payroll flag and dollar amount, to generate an ABA risk score, in an automated process that adds another risk score to the model, in addition to other risk scores that may be generated in present systems. During the modeling process, the values of the ABA risk curves can be adjusted to fit alert budgets. For example, if a team of fraud analysts can only analyze 100 potentially fraudulent transactions in a given time, then the alert sensitivity can be adjusted accordingly.

The process for determining the strength of connection between two banks requires a probability analysis, as described below. Considering two events, A and B, the probability of event A is denoted P(A), and the probability of event B is P(B). The probability of A, on the condition that B has already occurred, is written P(A|B). The probability of both A and B occurring is P(A, B). As an example, suppose A is the probability of flipping a coin twice and getting a head both times. B is the probability of the first coin flipped being a head.

$$P(A) = P(A, B) = 0.25,\ P(B) = 0.5 \text{ and } P(A \mid B) = 0.5 \qquad \text{(EQN. 1)}$$

The law of conditional probability states that P(A,B)=P(A|B)*P(B). Similarly, Bayes theorem that states that P(A, B)=P(A|B)*P(B)=P(B|A)*P(A) so that $$P(A \mid B) * P(B) = P(B \mid A) * P(A) \qquad \text{(EQN. 2)}$$

In the coin flip example, this last equation is 0.5*0.5=1*0.25 (Note that P(B|A)=1, because if it is known that the first two coins are heads, then the probability the first coin is a head is 100%.)

For fraud detection, the event that a transaction is a fraud can be represented as F. Similarly the letters ABA can represent the event that the transaction is going to the routing number ABA, and the letter T can represent the event that the tenant bank is bank T. With this in mind, P(F & ABA|T) is the probability that an event is a fraud and the money is being sent to routing number ABA and comes from bank T. Using the law of conditional probability gives of Bayes theorem given that T has occurred:

$$P(F, ABA, T) = P(F \mid ABA, T)P(ABA, T) = P(F \mid ABA, T)P(ABA \mid T)P(T) \qquad \text{(EQN 3)}$$

$$P(F, ABA, T) = P(ABA \mid F, T)P(F, T) = P(ABA \mid F, T)P(F \mid T)P(T) \qquad \text{(EQN 4)}$$

And therefore:

$$P(ABA \mid F, T)P(F \mid T)P(T) = P(F \mid ABA, T)P(ABA \mid T)P(T) \qquad \text{(EQN 5)}$$

or $$P(ABA \mid F, T)P(F \mid T) = P(F \mid ABA, T)P(ABA \mid T) \qquad \text{(EQN 6)}$$

Thus, the probability of fraud at bank T as a function of the ABA can be represented as P(F|ABA,T). Therefore:

$$P(F \mid ABA, T) = P(ABA \mid F, T)P(F \mid T)/P(ABA \mid T) \qquad \text{(EQN 7)}$$

The term P(FIT) is constant for bank T, so the equation can be simplified as $$P(F \mid ABA, T) \sim P(ABA \mid F, T)/P(ABA \mid T) \qquad \text{(EQN 8)}$$

The term P(ABA|F,T) is the probability that the tenant bank experiencing a fraud sees that fraud coming from routing number ABA. Or, loosely speaking, the probability of the fraudster using routing number ABA. If this were constant, the probability of fraud would be inversely proportional to P(ABA|T), although there is little reason to think P(ABA|F,T) is indeed constant. However, valuable information can still be gained by identifying level curves of this function-namely, collections of ABA numbers where this function is approximately constant. It is reasonable and consistent with historical data to believe that the fraudster picks a "type" of bank. To first order, this can be broken down into (1) money center banks (2) big banks that are not money centers, (3) medium-sized banks, and (4) small banks. As more data is gathered, a substantial geographic component can also emerge, that may be dynamic over time. However, to avoid overfitting the model, it may be desirable to use only bank size to determine the approximate level curves.

With this this in mind, the universe of banks (ABAs) could be partitioned, e.g., into 4 sets based on size and on each set:

$$P(F \mid ABA, T) \sim 1/P(ABA \mid T) \qquad \text{(EQN 9)}$$

Thus, given a size associated with an ABA, a risk can be assigned based on the value of 1/P(ABA|T). Without being bound by theory, this appears to make intuitive sense-P(ABA|T) could be small because it is a big bank that is far away, or because it's a small bank that is down the street. The first cause would be more surprising and hence carry more risk. And because these banks are in different level sets, they would have different constants of proportionality and hence different risk levels. Therefore, the goal is to estimate the unusualness of a transaction for a given sized ABA.

The ABA risk assessment system may therefore include a computer-implemented method to automatically determine the risk level of a transaction based exclusively or primarily on the transaction's routing number. The system begins with a preprocessing step based on a list of routing numbers (each associated with a respective institution) and a list or group of transactions (e.g., dollar amount, sending institution, and routing number of the receiving institution from the list of routing numbers, where some of the transactions are legitimate and some are fraudulent). For each respective routing number, based on the legitimate transactions, the system determines a transaction volume associated with that routing number, and a relative probability of a legitimate transaction being sent from that routing number to other routing numbers on the list of routing numbers. Then, for each of the respective other routing numbers on the list of routing numbers, based on the transaction volume associated with that routing number, the system determines a risk curve for transactions from the respective routing number to the respective other routing number based on the dollar amount and the relative probability of a legitimate transaction being sent from the respective routing number to the respective other routing number. At this point, minimal required preprocessing is complete and the system may be ready for real-time operation.

During real-time operation, for any new transaction from a given tenant bank, using the appropriate risk curve that was computed for the tenant bank and recipient bank, a risk score can be computed based on the dollar amount of the transaction. If the risk score exceeds a specified threshold risk level, the system generates an alert for the transaction.

Figure 4:
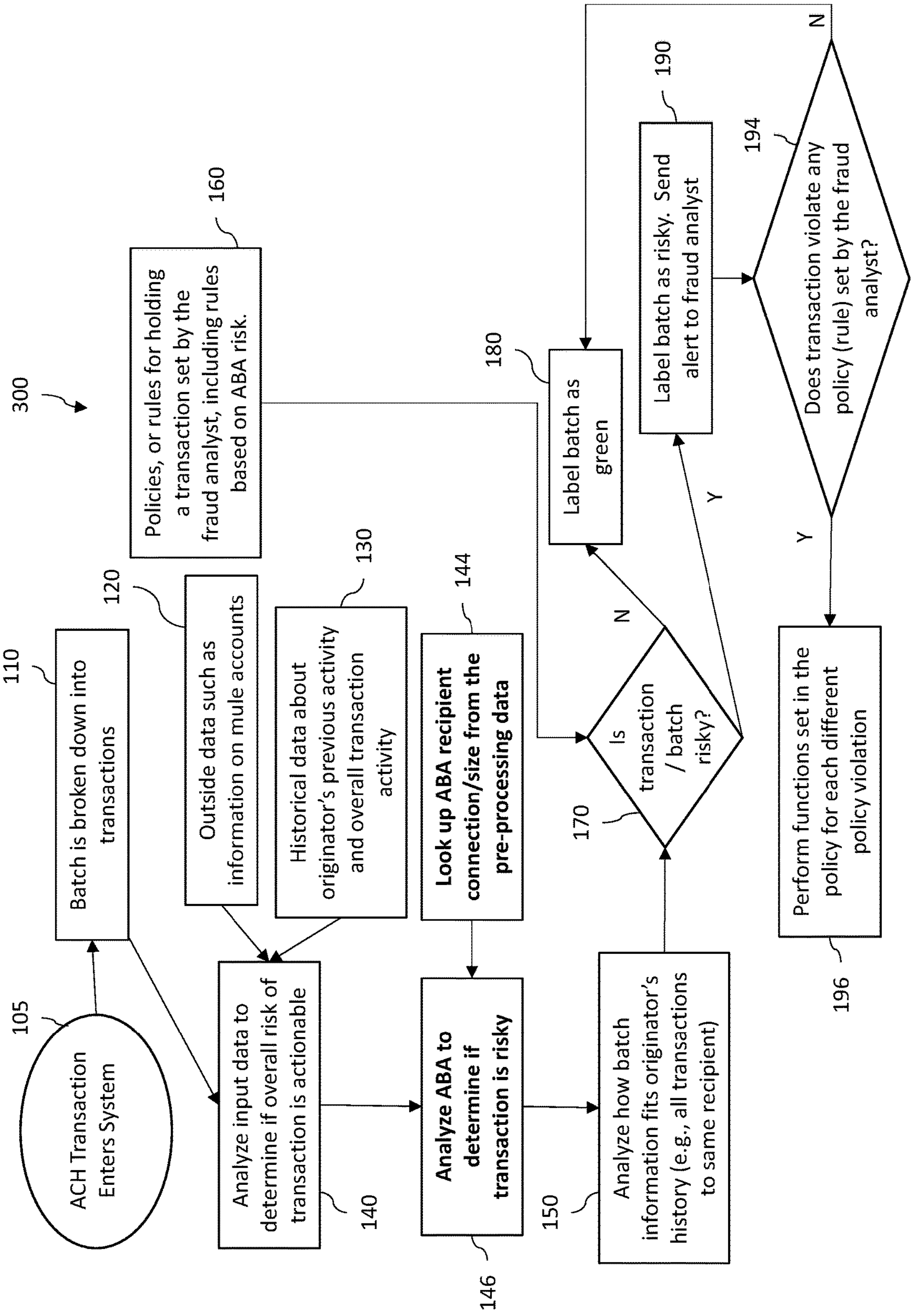
FIG. 4 is a is a schematic, diagrammatic representation, in hybrid flow diagram and block diagram form, of at least a portion of an example fraud detection and ABA risk assessment method, in accordance with at least one embodiment of the present disclosure.

FIG. 4 is a is a schematic, diagrammatic representation, in hybrid flow diagram and block diagram form, of at least a portion of an example fraud detection and ABA risk assessment method 300, in accordance with at least one embodiment of the present disclosure. The method 300 of FIG. 4 is similar to the method 100 of FIG. 2, except that ABA risk assessment functionality has been added, to enable transactions to be risk-assessed based on the ABA routing number of the receiving institution, even if all other signals appear to be low-risk.

In step 105, the method 300 includes receiving a batch of ACH transactions, each of which includes features or variables such as a dollar amount, a payroll flag, and an ABA routing number of the receiving institution. Execution them proceeds to step 110.

In step 110, the method 300 includes breaking the batch down into individual transactions. Execution them proceeds to step 140.

In step 140, the method 300 includes selecting the next transaction from the batch and, for the current transaction, analyzing the features or variables of the transaction to determine the overall risk of the transaction (e.g., by computing an overall risk score). This analysis incorporates outside data 120, which may for example include information on known mule accounts, and historical data 130, which may for example include data about the originating institution's previous activity and overall transaction activity. Execution them proceeds to step 146.

In step 146 the method 300 includes, for each transaction in the batch, analyzing the recipient ABA to determine if the transaction is risky (e.g., by computing an ABA risk score). This may for example involve a lookup table 144 to determine the size of the sending institution, the size of the receiving institution, and the strength of the connection between the sending institution and the receiving institution. Execution then proceeds to step 150.

In step 150, the method 300 includes analyzing how the batch information compares against the history of the originator (e.g., the sending institution). This analysis may for example involve looking at the variables or features of all transactions sent to the same recipient, to determine a history risk score. Execution then proceeds to step 170.

In step 170, the method 300 includes determining whether the batch (or a transaction within the batch) is risky, e.g., whether a computed risk score exceeds the threshold value. This determination may rely on policies or rules 160, which may for example be limits, ranges, triggers, or conditionals for the risk scores or other signals that have been set by a human fraud analyst and stored within a memory of the ABA risk assessment system. In the method 300 of FIG. 4, unlike the method 100 of FIG. 2, these policies can include rules based on ABA risk. One example policy may be to alert any transaction whose ABA connection score is <0.8 and whose dollar amount is greater than $25,000, regardless of the size of the sending or receiving institution. Myriad other policies are possible using this and other data. If no policy is violated, execution proceeds to step 180. If any policy is violated, execution proceeds to step 190.

In step 180, the method 300 includes labeling the batch as green, e.g., non-fraudulent or non-suspect. This may for example enable the sending bank's computer system to execute the transaction, or indicate to a fraud analyst that the batch does not contain any suspect transactions and should thus be authorized. The method 300 is now complete In step 190, the method 300 includes labeling the batch of transactions as risky, and sending an appropriate alert to a fraud analyst. Execution then proceeds to step 194.

In step 194, the method 300 includes determining whether the transaction violates any of the policies or rules set by the fraud analyst. If yes, execution proceeds to step 196. If no, execution proceeds to step 180.

In step 196, the method 300 includes performing the actions or functions set in each of the violated policies, for each of the violating transactions. The method 300 is now complete.

Figure 5:
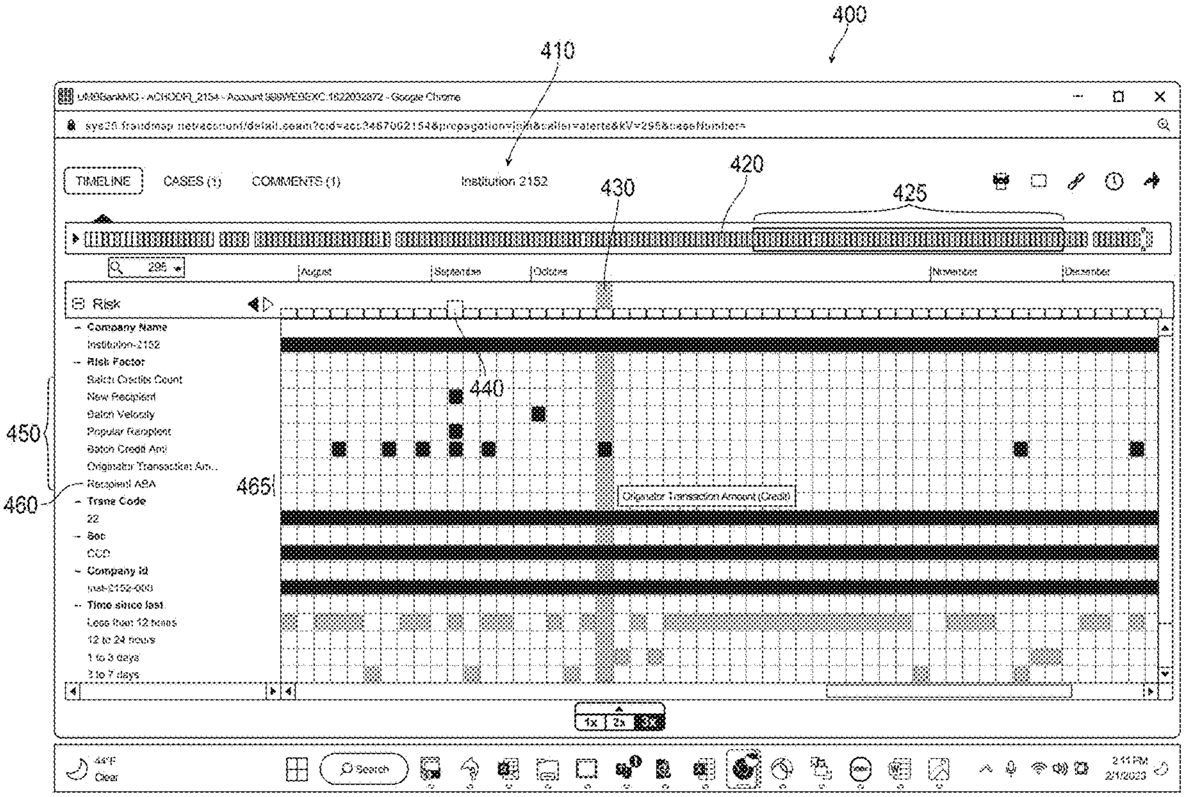
FIG. 5 is a screen display for an example ABA risk assessment system, in accordance with at least one embodiment of the present disclosure.

FIG. 5 is a screen display 400 for an example ABA risk assessment system, in accordance with at least one embodiment of the present disclosure. Each transaction in a batch is analyzed for its activity and how it fits into the batch. A risk score this then calculated. The ABA risk is noted and added to the overall batch risk. The model may also specify the reasons the batch was alerted. The alert will be sent to the risk analyst, and if the risk analyst has set policies to automatically hold an alerted batch, that batch will be held. The fraud analyst can then click on their alert warning, and the timeline of the originator may be displayed.

A timeline 420 for a given tenant bank 410 includes batches 425, one of which is highlighted. The overall risk 430 for the batch is green, meaning the batch is not alerted as there is no detected fraud based on threshold settings. However, there are some red rows 440, meaning some unusual activity has been detected, but not enough to warrant an alert. In the bottom panel 450, more detail is shown about the unusual activity for this batch. It shows the recipient was new and the SEC code was unusual for this originator. The present system can be directed to hold such transactions for analyst review even if they are not flagged as red overall, which might permit the analyst to review it more carefully to spot a new or evolving fraud scenario.

ABA risk 560 is one of the risk factors. If the ABA number is computed to be typical, the related square 465 for that transaction is green. If the ABA number is computed to be unusual, then the square 465 is red, and the overall risk 430 is also red. It is understood that this screen display is shown here for exemplary purposes, and myriad other screen displays could be used instead or in addition, to provide ABA risk information to a user.

Figure 6:
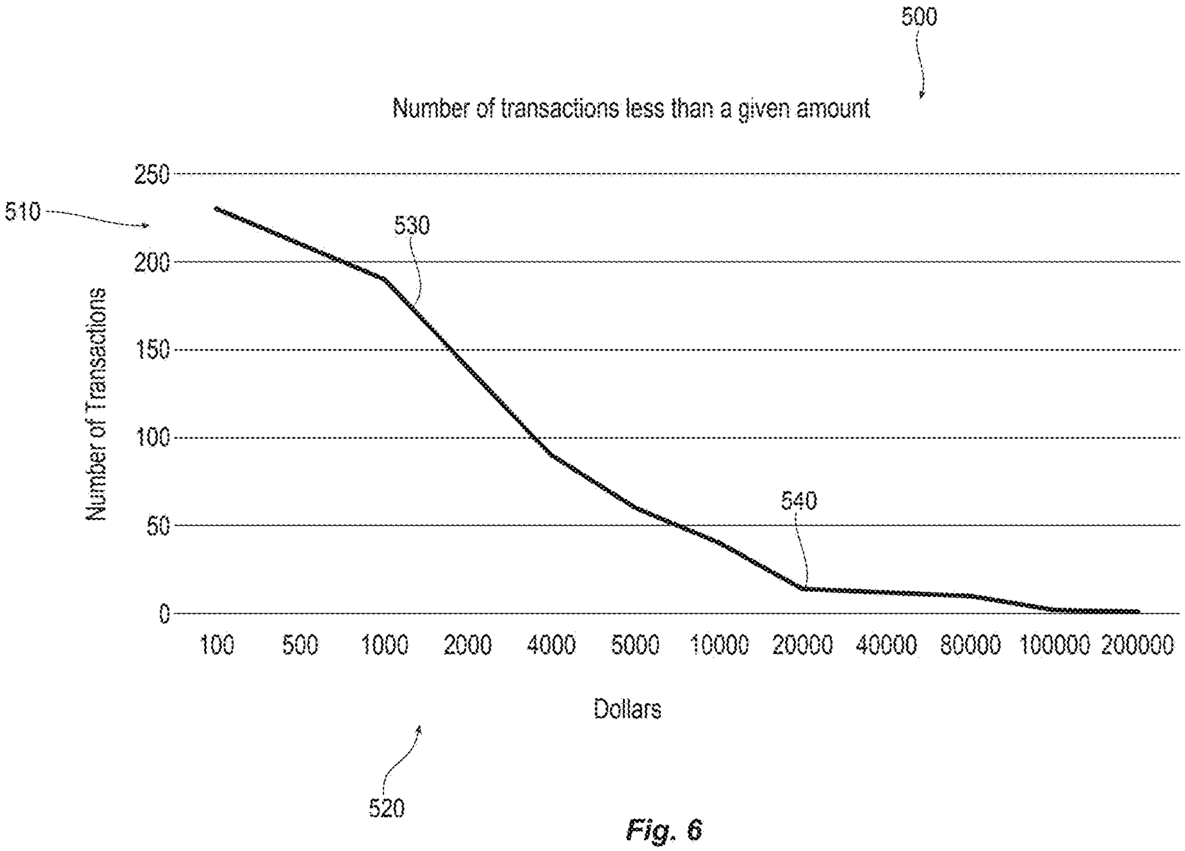
FIG. 6 is a graph showing the dollar amount of a transaction on the X-axis, and the number of transactions less than that dollar amount on the Y-axis, in accordance with at least one embodiment of the present disclosure.

FIG. 6 is a graph 500 showing the dollar amount of a transaction on the X-axis 520, and the number of transactions less than that dollar amount on the Y-axis 510, in accordance with at least one embodiment of the present disclosure. A curve 530 shows that there are relatively more transactions of low dollar amount, and relatively fewer transactions of high dollar amount. This curve 530 may change in shape or scale depending on the bank and location, but the inverse relationship between transaction size and number of transactions may be considered reliable.

Given a bank type for each normalized likelihood score, the amount and number of transactions can be used to gauge the probability of any given transaction. If the normalized likelihood score is fixed, the level curve may be a decreasing function of amount, and typically has an elbow 540 or other similar shape. In other words, the graph drops rapidly to a small number and then bends (e.g., at the elbow) to a shallower or flatter slope. This elbow 540 can be considered a critical value for the given amount bin and the bank type. In the example shown in FIG. 6, the elbow 540 occurs at a dollar amount of ~$20,000. Thus, the ABA risk assessment system may be configured to alert transactions above $20,000 for that recipient ABA (as its relative probability is already known). This can be thought of as an amount risk factor, which could in principle be used by itself, although it may be preferable to combine amount risk with the strength of connection between the sending and receiving institutions, in order to compute an ABA risk factor.

It is noted that fraudsters who impersonate vendors rarely do so for small-dollar-value vendors where the invoice amount is likely to be small, and are much more likely to impersonate high-dollar-value vendors who submit large invoices. Thus, in order to keep the alert rate down and catch these important frauds, risk is computed as a function of the relatively ABA likelihood and the amount.

Figure 7:
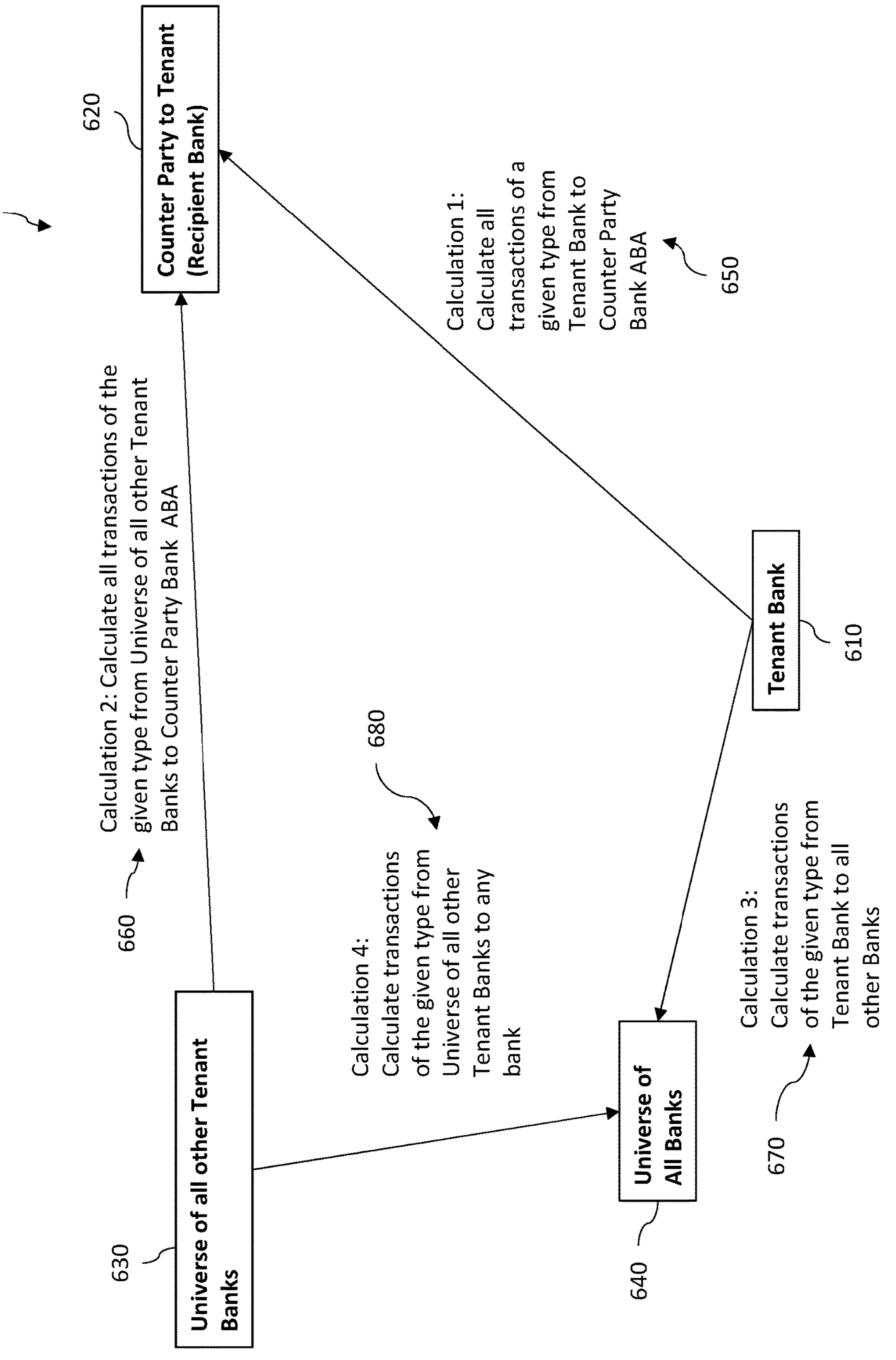
FIG. 7 is a schematic, diagrammatic representation, in block diagram form, of a transaction probability table calculation, in accordance with at least one embodiment of the present disclosure.

FIG. 7 is a schematic, diagrammatic representation, in block diagram form, of a transaction probability table calculation 600, in accordance with at least one embodiment of the present disclosure. Visible are the tenant bank 610, counter party or recipient bank 620, universe of all other tenant banks 630, and universe of all banks 640. For a given tenant bank 610, a first calculation 650 determines the number of all transactions of a given type from the tenant bank 610 to the counter party bank 620. A second calculation 660 determines the number of all transactions of the given type from the universe of all other tenant banks 630 to the counter party bank 620. A third calculation 670 determines the number of all transactions of the given type from the tenant bank 610 to any bank 640. A fourth calculation 680 determines the number of all transactions of the given type from the universe of all other tenant banks 630 to any bank 640.

Together, these calculations give the probability of other tenant banks in the universe of other tenant banks 630 sending transactions to the counter party bank. For example, let P1 equal the number of transactions of this type from the tenant bank to the counter party bank, divided by the number of transactions of this type from the tenant bank to any bank. Let P2 equal the number of transactions of this type from all other tenant banks to the counter party bank, divided by the number of transactions of this type from all other tenants to any bank. The ratio of these two values (e.g., P1/P2) gives a relative probability of the tenant bank 610 sending a transaction to the counter party bank 620.

Figure 8:
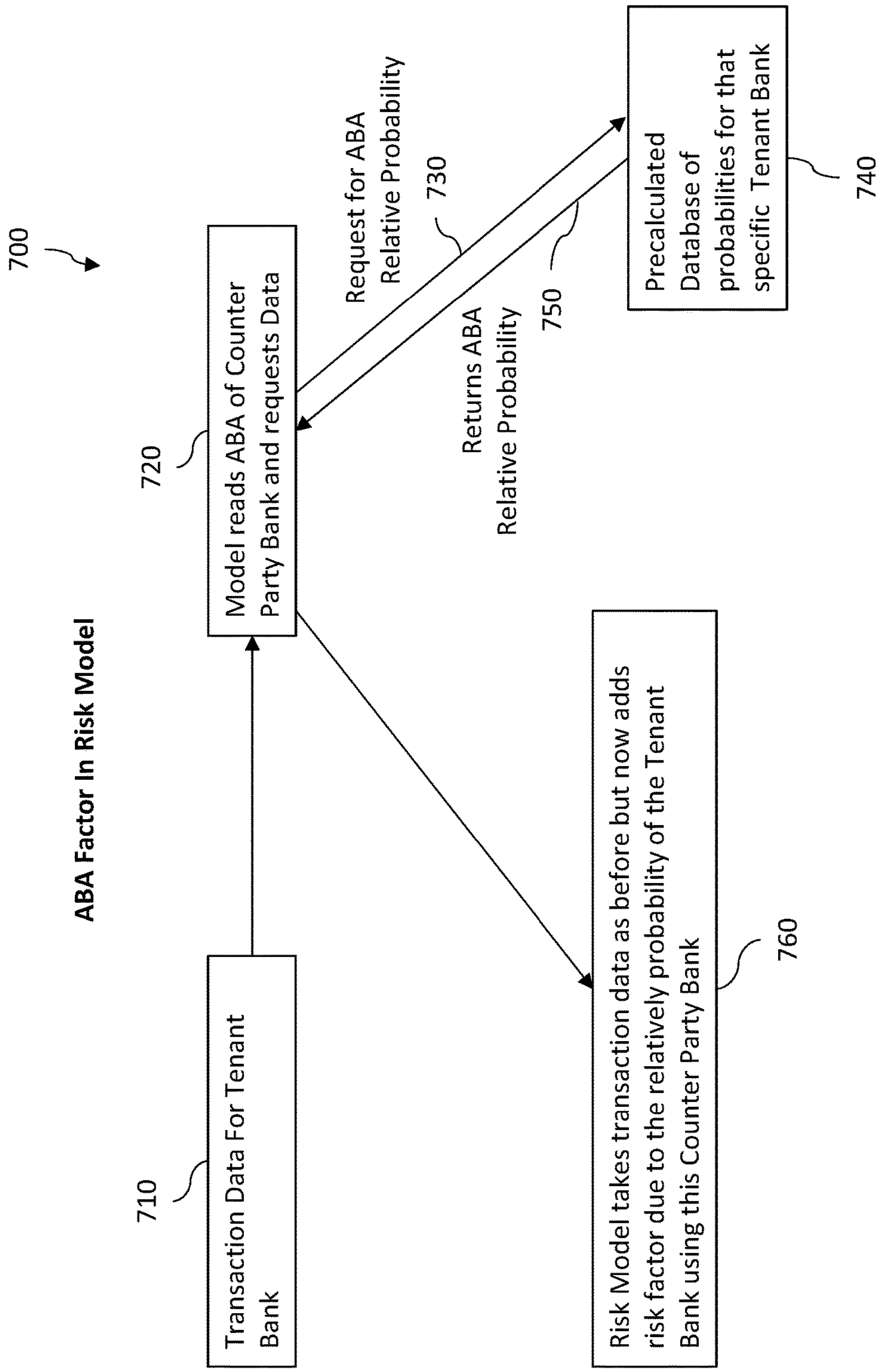
FIG. 8 is a schematic, diagrammatic representation, in block diagram form, of a transaction probability table calculation 700, in accordance with at least one embodiment of the present disclosure.

FIG. 8 is a schematic, diagrammatic representation, in block diagram form, of a transaction probability table calculation 700, in accordance with at least one embodiment of the present disclosure. In the example shown in FIG. 8, the transaction data for the tenant bank 710 is received by the fraud detection model 720. The fraud detection model 720 reads the ABA of the counter party bank or recipient bank, and issues a request 730 for the relative probability of a transaction from the tenant bank to that ABA. The request 730 pulls data from the database 740 of probabilities for that specific tenant bank (e.g., computed during the pre-processing stage), which returns the relative probability value 750. In an evaluation step 760, the risk model 720 then computes an ABA risk factor (e.g., the relative probability of the tenant bank 710 sending funds to this particular counter party bank), as well as other risk factors already calculated in existing systems.

Figure 9:
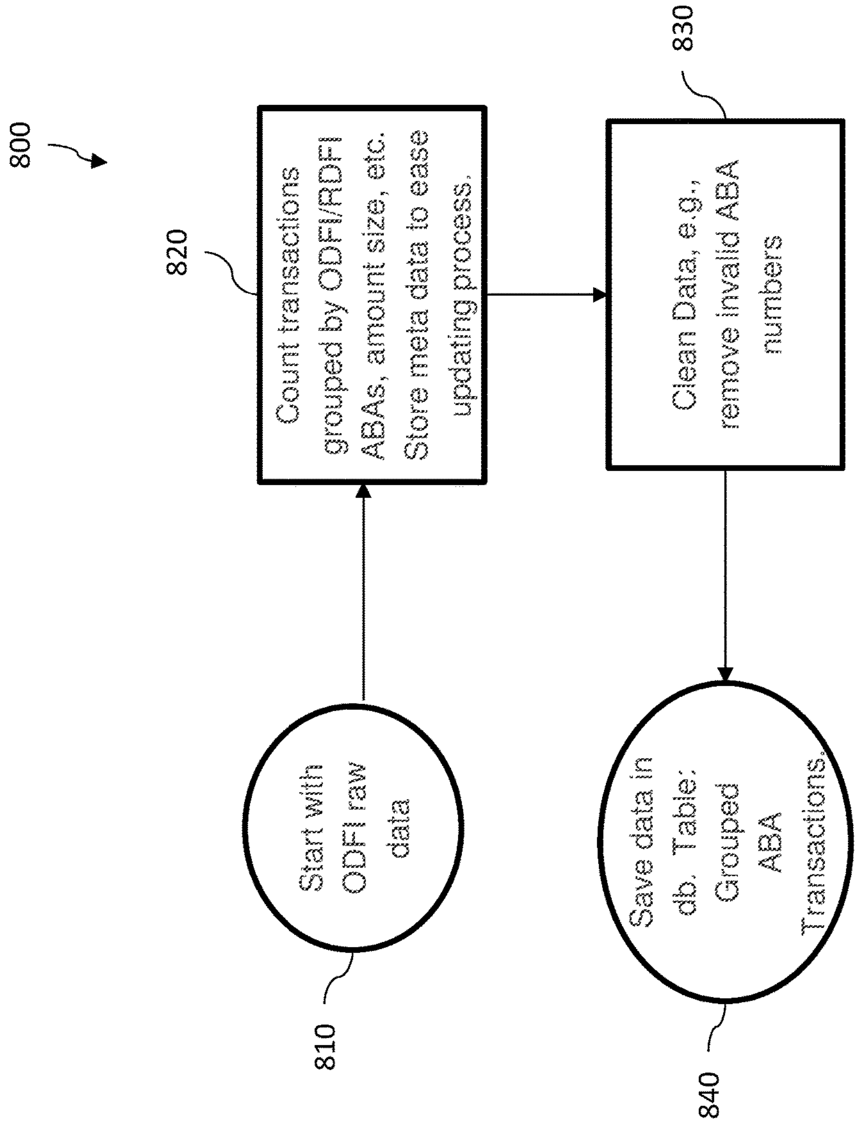
FIG. 9 is a schematic, diagrammatic representation, in flow diagram form, of an ABA risk preprocessing method 800, in accordance with at least one embodiment of the present disclosure.

FIG. 9 is a schematic, diagrammatic representation, in flow diagram form, of an ABA risk preprocessing method 800, in accordance with at least one embodiment of the present disclosure.

In step 810, the method 800 includes receiving historical transactions in an ODFI raw data format.

In step 820, the method 800 includes counting the transactions, grouped by ODFI (sender) ABA, RDFI (recipient) ABA, dollar amount, and payroll flag. Other variables may be used instead or in addition. Metadata relating to these variables is also stored, in order to make the database easier to update. The system keeps track of transaction direction, a binned amount, if the transaction was believed to be a payroll transaction, and if the counter parties have previously had a transaction. The data is then grouped by the parameters.

In step 830, the method 800 includes cleaning the data. This cleaning may for example include removing corrupted records, removing records with invalid ABA numbers, etc. The data may for example be stored in an intermediate database called Grouped ABA Transactions. Full data on payroll status or previous transaction data, however, may not always be available. Thus, these parameters can be ignored or emphasized in the tuning process.

In step 840, the method 800 includes saving the cleaned transaction data in a database table, grouped by ABA as described above. This process may be repeated for every tenant bank in the system and every new tenant bank entering the system. This method can be time consuming and can take several weeks' worth of data collection and computing time.

ABA numbers are actual numbers. However, the leading digit is often a 0, which can cause confusion if not properly addressed. For concreteness, all ABA numbers may be considered to be strings with the leading 0 required. If a leading 0 is omitted, the code may append it. An example of this process is as follows:

Let T be a tenant bank. Go to the tenant data. Let F be the set of files. Let [0,2], (2,100], (100,20000], (20000,100000], (100000,200000], (200000,infinity) be a partition of amounts. Do the following pseudocode:

For File in F:
  For line in file:
    If line is a transaction add one to the count of transactions defined by the following parameters: Tenant bank model id, tenant bank ABA, recipient bank ABA, flag if a payroll, direction of payment, amount bin, year of transaction, state where payment occurred (if available.)
  When all files have been parsed, record the count in each 8 dimensional binning created above. Also record the name of the files that have been parsed. Thus, the database may contain two tables.

Grouped_ABA_Transactions: This contains a count of transactions and a value for each of the parameters Tenant bank model id, tenant bank ABA, recipient bank ABA, payroll flag, direction of payment, amount bin, year of transaction, and state.

ach_data_pe_files: contains two fields, the tenant bank and the files for that tenant bank that have been parsed.

The next step is to clean the table Grouped ABA Transactions to make sure the recipient ABA numbers are valid. There are two tests implemented. The first test is to make sure the check digit (the $9^{th}$ digit and last digit of the ABA) number is valid.

The test for this may be:

$$(3(d_1+d_4+d_7)+7(d_2+d_5+d_8)+(d_3+d_6+d_9))\bmod 10=0$$

The second test is on the first four digits. There are currently 164 different processing centers in the ACH network, and the first 4 digits represents which processing center the transaction is sent to. There are some spurious cases when the first 2 digits are 40 or greater which are not handled by a typical ACH transfer. These cases may be considered to be in error and ignored. The following pseudocode to verify the first four digits.

Let $A_{12}$ be the first 2 digits of a possible ABA and $A_{34}$ the $3^{rd}$ and $4^{th}$ digits.

If $A_{12}<20$, let $B_{12}=A_{12}$. Otherwise let $B_{12}$=string (int $(A_{12})-20$), formatting $B_{12}$ with a leading 0 if needed. Let A' 14 be the 4 digit string that is the concatenation of $B_{12}$ and $A_{34}$.

If $A'_{14}$ is in the set

```
{1210,1211,1212,1213,1214,1220,1221,1222,1223,1224,1230,1231,1232,1233,12
40,1241,1242,1243,1250,1251,1252,1110,1111,1113,1119,1120,1122,1123,1163,1130,1131,
1140,1149,1010,1011,1012,1019,1020,1021,1022,1023,1070,1030,1031,1039,1040,1041,104
9,0910,0911,0912,0913,0914,0915,0918,0919,0960,0920,0921,0929,0810,0819,0812,0815,0
865,0820,0829,0830,0813,0839,0863,0840,0841,0842,0843,0710,0712,0719,0720,0724,0730
,0739,0740,0749,0750,0759,0711,0610,0611,0612,0613,0620,0621,0622,0630,0631,0632,06
60,0670,0640,0641,0642,0650,0651,0652,0653,0654,0655,0510,0514,0520,0521,0522,0540,
0550,0560,0570,0530,0531,0515,0519,0532,0539,0410,0412,0420,0421,0422,0423,0442,043
0,0432,0433,0434,0440,0441,0310,0311,0312,0313,0319,0360,0210,0212,0214,0215,0216,0
219,0260,0280,0213,0220,0223,0110,0112,0113,0114,0115,0111,0118,0119,0211,0116,0117
}
```

then the ABA is deemed valid.

Figure 10:
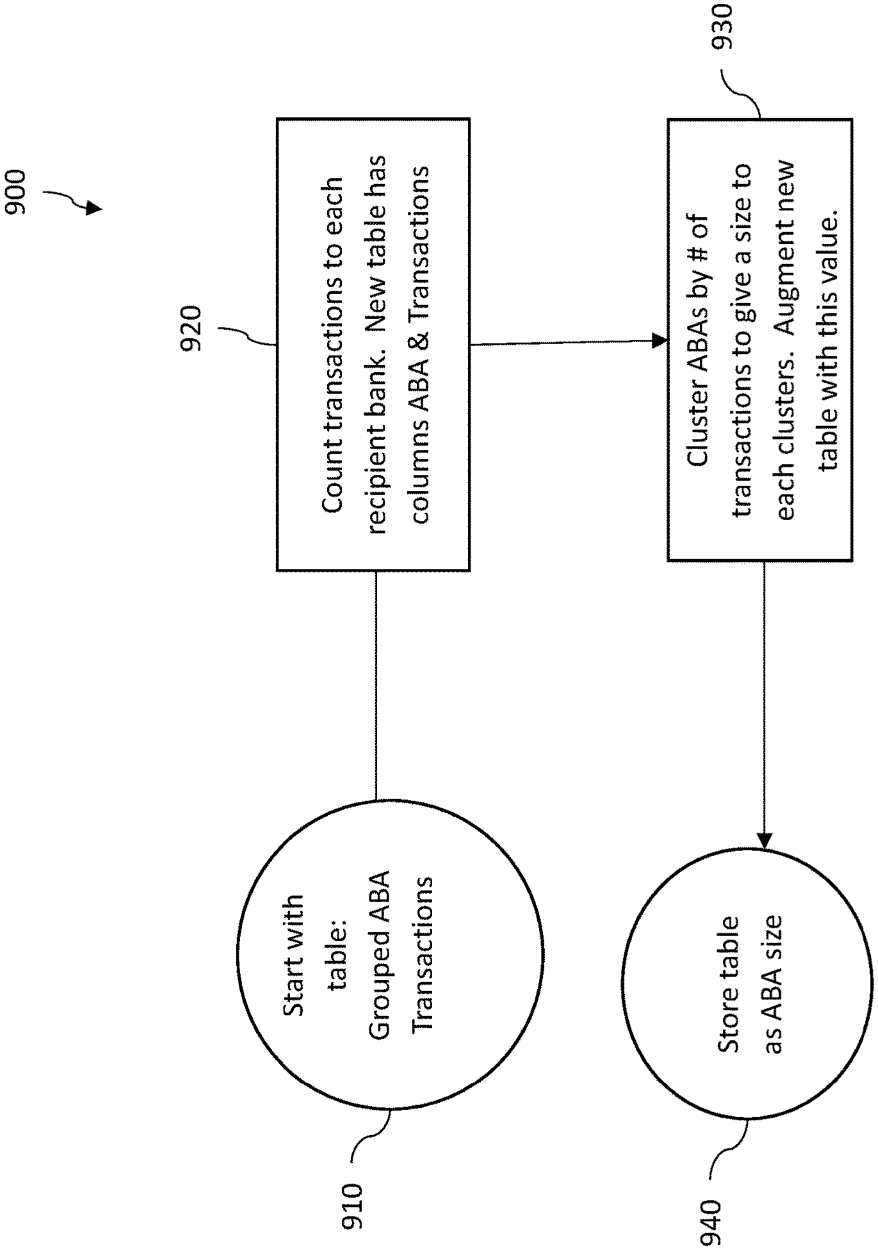
FIG. 10 is a schematic, diagrammatic representation, in flow diagram form, of an ABA risk preprocessing method 900, in accordance with at least one embodiment of the present disclosure.

If the ABA number passes both tests, the record is kept. Otherwise the record is discarded. The table Grouped ABA Transactions may be updated by using these tests to remove invalid ABA numbers FIG. 10 is a schematic, diagrammatic representation, in flow diagram form, of an ABA risk preprocessing method 900, in accordance with at least one embodiment of the present disclosure.

In step 910, the method 900 includes receiving the table Grouped ABA transactions from the database, as described above. This table Grouped ABA Transactions can be used to estimate the size and geo-location for each recipient bank.

In step 920, the method 900 includes counting the transactions to each recipient bank, to create a new table that has columns for ABA and Transactions. At this point the system can cluster the universe of recipient banks by size.

In step 930, the method 900 includes clustering the ABAs in the table by the number of transactions a bank sends and receives, to give an approximate size to each cluster. Using a number of banks with known size (e.g., 6 banks), the total number of transactions each bank has in the recipient bank data provides a correlation between size (e.g., large, medium, or small) and the number of transactions. In this sense, it may be desirable to select banks that are on the cusp of small and medium size, or between medium and large size, to help determine where these boundaries should be placed. Next, using a larger number of banks with known size (e.g., 30 banks), the clustering can be verified to see if it is accurate, or in need of recalculation. It is noted that the number of recipient transactions may not cluster in a typical statistical pattern, and also that it may not be critical to place every bank in the correct size bin, as long as the majority are placed correctly.

In step 940, the method 900 includes storing these size estimates in a table called ABA size, which contains at least the ABA, total number of transactions, and a label indicating the estimated size of the bank.

In an example, the system may define large sized to be an ABA that has at least 0.2% of all transactions in the database. Medium sized may be defined as a bank that is not large but has at least 0.02% of all transactions. All others may be considered small. These partitions are exemplary; other values, both larger and smaller, may be used instead or in addition when analyzing actual bank size data. Exemplary, the pseudocode to perform these steps is as follows:

From the table Grouped_ABA_Transactions, sum up all the transactions. Call that number D. Then to calculate the % transactions the query is:

```
SELECT 100*SUM(counts)/D num,aba FROM
  Grouped_ABA_Transactions
GROUP BY recipient ABA
For ABA in {all recipient ABA} pick the number generated above
  If the number > .2, then the recipient ABA is large
  else if the number > 0.02 then the recipient ABA is medium
  else the recipient is small
```

Myriad other codes could be used instead, or in addition, to achieve the same or a similar result.

Figure 11:
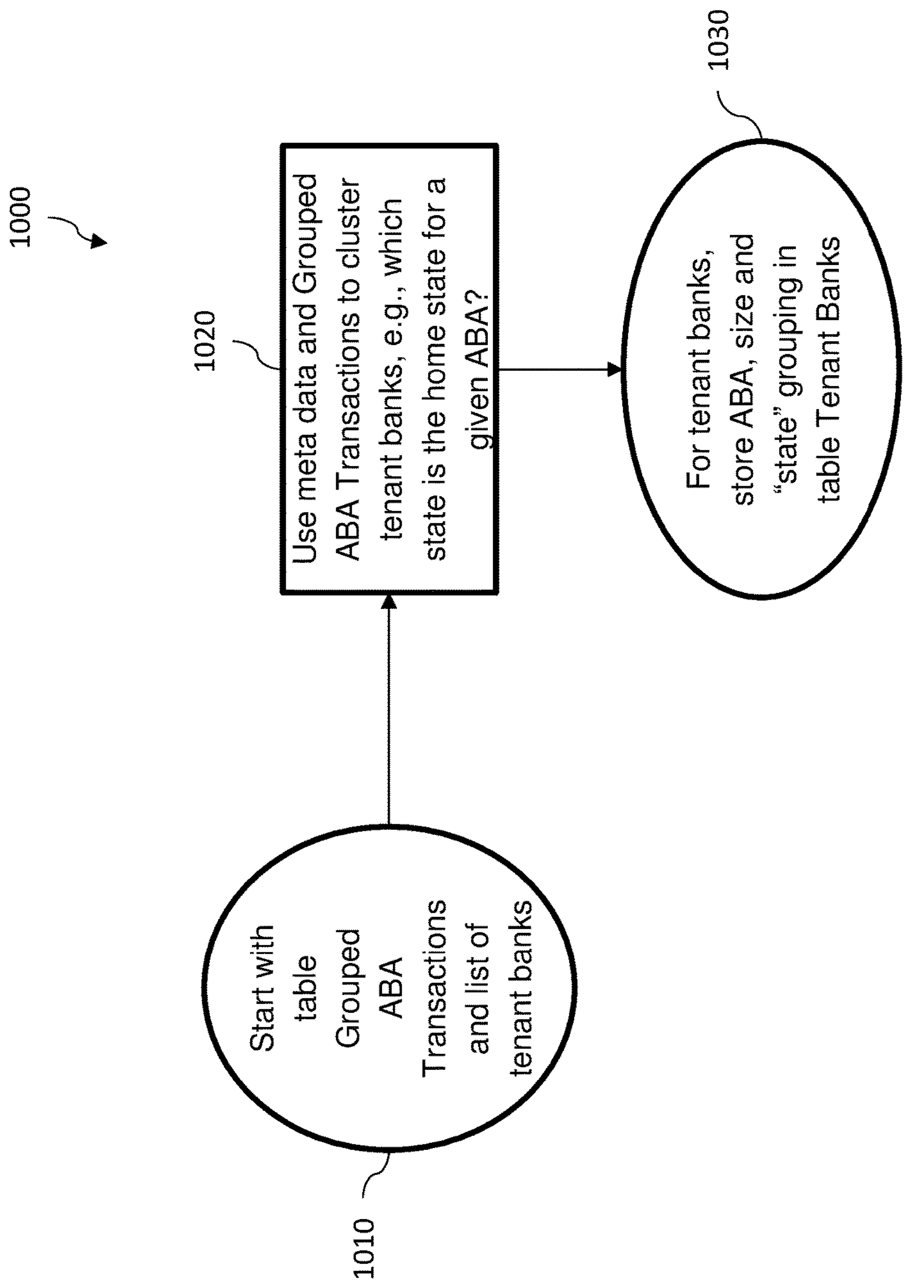
FIG. 11 is a schematic, diagrammatic representation, in flow diagram form, of an ABA risk preprocessing method 1000, in accordance with at least one embodiment of the present disclosure.

FIG. 11 is a schematic, diagrammatic representation, in flow diagram form, of an ABA risk preprocessing method 1000, in accordance with at least one embodiment of the present disclosure. At this point, it may be desirable to cluster banks according to their geolocation, by estimating the state or region most associated with each tenant bank ABA.

In step 1010, the method 1000 includes receiving the table Grouped ABA Transactions and a list of tenant banks.

In step 1020, the method 1000 includes using the metadata and grouped ABA transactions to cluster the tenant banks by state or region. Since the locations of tenant banks are likely known (e.g., by mailing address or physical address), the home state of tenant banks may not need to be determined. For smaller banks, that may be enough to label the state associated with the ABA. For larger banks with multiple ABAs, this determination can be more difficult. For a tenant with multiple ABAs, the system considers the transactions to other tenant banks and their estimated geolocations. The transactions are then compared to each state, and to the total data available for all tenant transactions to each state. This provides an estimate of the true home state for this ABA. If the signal is strong, it can be picked as the location of the ABA. Otherwise, the system will use the home state of the main ABA number as the location of the current ABA.

In step 1030, the method includes, for tenant banks, storing the ABA, size, and state or region grouping in the table Tenant Banks.

The following exemplary pseudocode may be employed for these calculations:

Let A be the set of tenant ABAs where the home state is known. Let B be the set of tenant ABAs where the home state is unknown.

For X an ABA in B, if the number of transactions is <100, the aba is basically unused and pick the known home state associated with the tenant.

Else, do the following calculation.

For each tenant bank in the set A, calculate how many transactions are done involving X. This provides a count for each state. For each state also calculate how many transactions are done to ABA's that are currently categorized to be in that state. The output is, for each state, a number of transactions. The number of transactions involving X and tenant banks in that state. And the number of transactions involving any bank and tenant banks in that state. The first number divided by the second gives a propensity for business in a given state. Call that P. The following pseudo code will assign a state.

if P>5 for a given state, pick that state.

else if the state associated with that tenant bank (recall this is not the main ABA for that tenant) has a propensity >1.5, pick that state.

else pick the state with the highest propensity.

Other codes may be used instead or in addition, to achieve the same or a similar result.

Figure 12:
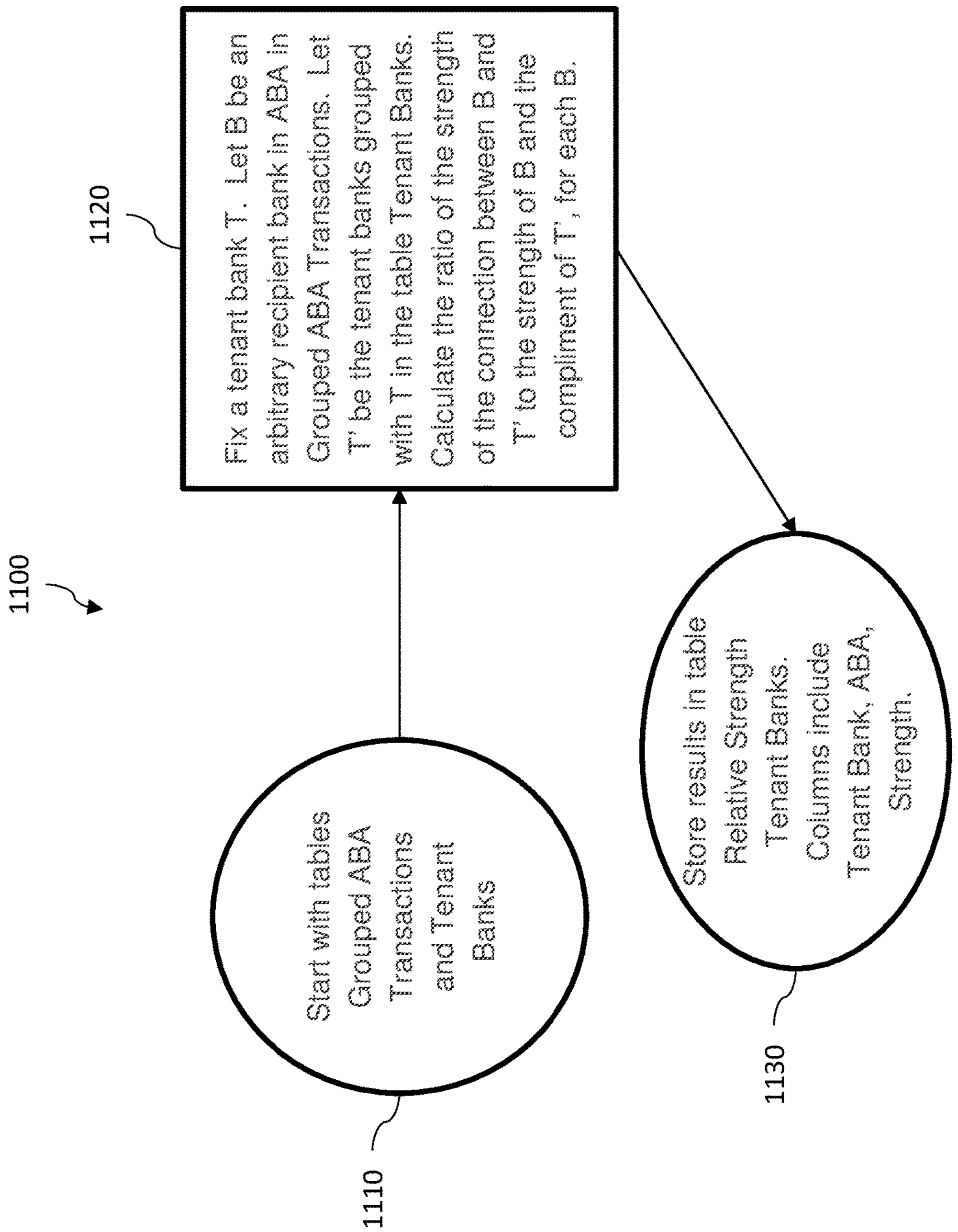
FIG. 12 is a schematic, diagrammatic representation, in flow diagram form, of an ABA risk preprocessing method 1100, in accordance with at least one embodiment of the present disclosure.

FIG. 12 is a schematic, diagrammatic representation, in flow diagram form, of an ABA risk preprocessing method 1100, in accordance with at least one embodiment of the present disclosure. At this point, it is desirable to calculate a connection strength between a tenant bank and each bank in its universe.

In step 1110, the method 1100 includes receiving the tables Grouped ABA Transactions and Tenant Banks from the database.

In step 1120, the method 1100 includes calculating the strength of the connection between a specific tenant bank and each potential recipient bank. Assuming T represents the tenant bank, for a given bank B in the universe of recipient banks, the method 1100 includes calculating the number of transactions between these two banks versus the expected number if nothing were known about the two. Simplistically, this could be calculated as: (# of transactions between T and B)/(# of transactions for T))/((# of transactions for all tenants with bank B)/(# of transactions for all tenant banks)). This would be the % of T's transactions with B divided by the % of all tenant banks with B. However, this may not work well, as banks that are geographically close to T may be overrepresented and thus throw the calculation off.

With this is mind, let T' be the collection of tenant banks that were determined to have a similar geo-location in the steps above. Let T'¬$^{c}$ be the complement of T', namely the set of tenant banks that are not judged to have a similar geo-location with T. Then the connection strength of T and B to can be calculated as: ((# of transactions between T and B)/(# of transactions for T))/((# of transactions for all tenants in T'¬$^{c}$ with bank B)/(# of transactions for all tenant banks in T'¬$^{c}$)).

For edge cases-banks that have very few transactions with any bank-a low connectivity will be computed. The following pseudocode may be used:

Let T be a fixed tenant bank. Let T' be the collection of ABA numbers that have the same home state as the tenant ABA. Let C be the set compliment of T', namely all the tenant ABAs that are associated with a different state.

For B in {all recipient ABAs) calculate ((# of transactions between T and B)/(# of transactions for T))/((# of transactions for all tenants in C with bank B)/(# of transactions for all tenant banks in C)).

This will be the strength of the connection. If there are no transactions in any of these 4 calculations, flag the ABA as tiny.

In step 1130, the method 1100 includes storing the results in the table Relative Strength Tenant Banks, which includes the columns Tenant Bank, ABA, and Strength.

Figure 13:
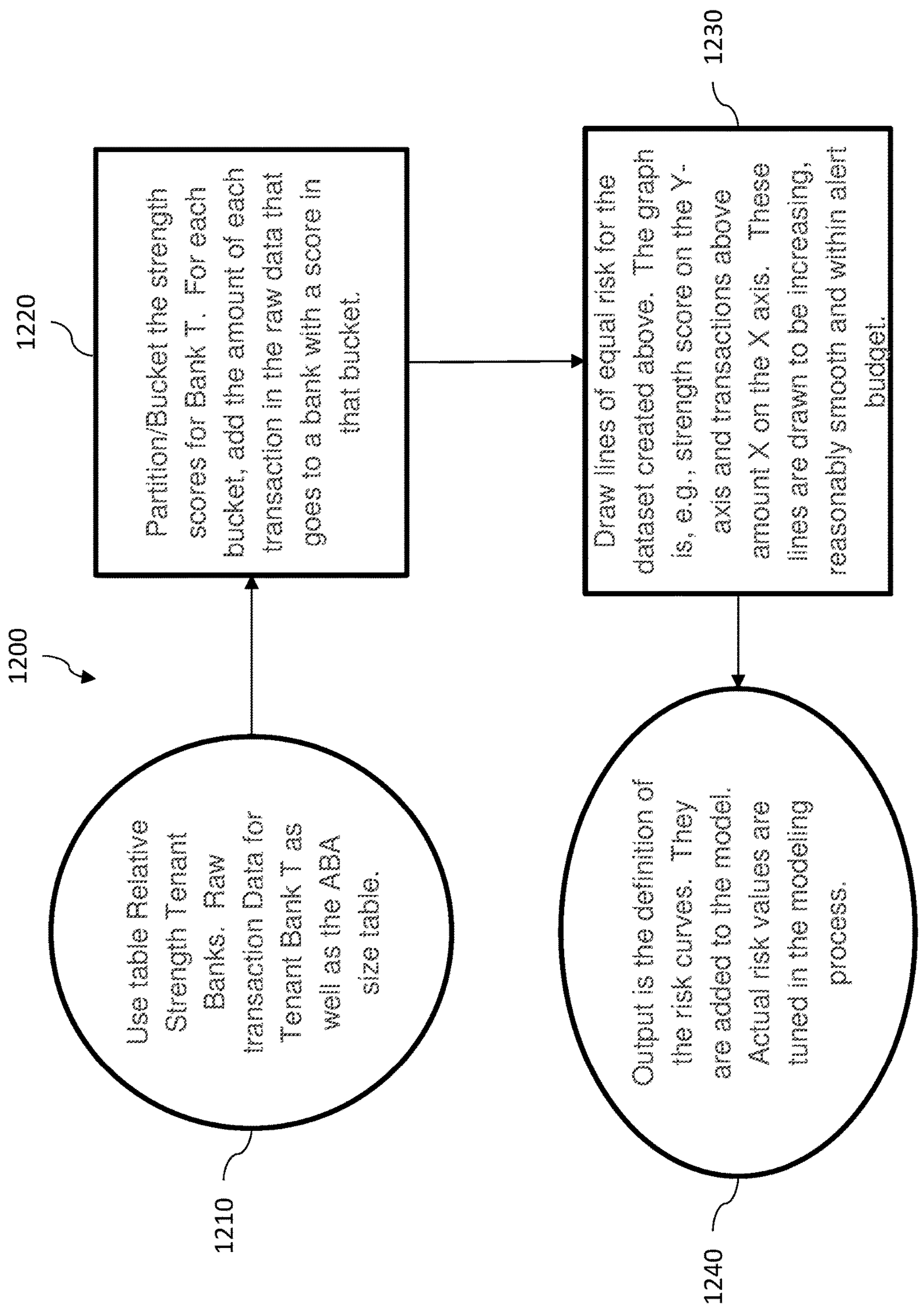
FIG. 13 is a schematic, diagrammatic representation, in flow diagram form, of an ABA risk preprocessing method, in accordance with at least one embodiment of the present disclosure.

FIG. 13 is a schematic, diagrammatic representation, in flow diagram form, of an ABA risk preprocessing method 1200, in accordance with at least one embodiment of the present disclosure. For a fixed tenant bank and a fixed size group on the universe of banks, it is now desirable to create a risk curve as a function of dollar amount and the connection strength.

In step 1210, the method 1200 includes receiving the tables Relative Strength Tenant Banks, ABA Size, and the raw transaction data for tenant bank T.

In step 1220, the method 1200 includes partitioning or bucketing the strength scores for bank T by, for each bucket, adding the amount of each transaction from the raw data that goes to a bank with a score in that bucket.

In step 1230, the method 1200 includes drawing lines of equal risk for the dataset. The graph may for example be strength score on the Y-axis and transactions above amount X on the X axis. These lines may for example be drawn to be increasing, reasonably smooth and within a specified alert budget.

In step 1240, the method 1200 includes outputting the definitions of the risk curves and adding them to the risk model as described above. The risk score can be derived by selecting the curve for the particular tenant bank and recipient bank, performing a lookup along the curve based on the dollar amount, and then computing the ABA risk score.

ABA score is the relative probability of the transaction, as described above in FIG. 7, where for example an ABA score of 1.0 may mean the transaction has an average probability, below 1.0 means a lower than average probability, and above 1.0 means a higher than average probability, with a hypothetical value of 0.0 indicating that the transaction has a zero probability of being legitimate. These values can be partitioned into bins so that, for example, ABA scores between 0.0 and 0.8 fall into the following four bins: [0,0.2), [0.2, 0.3), [0.3, 0.4), [0.4, 0.6), [0.6, 0.8]. In an example, for each partition, the following substeps are implemented:

1) For each new recipient bank that has an ABA with a relative probability score in this partition, find the amount of money sent to that account/ABA for the first transaction. (Other example may, instead or in addition, use the max amount in the first few days that these transactions occur between this originator/recipient pair.)
2) Create a graph where the Y axis is a transaction count and the X axis is a dollar amount (as shown for example in FIG. 6, above). At a given point X (e.g., a dollar amount such as $20,000) Y is the number of occurrences of a transaction of $20,000 or more with an ABA relative probability within the selected partition. Thus, if the partition is [0,2, 0.3) the query result is the number of occurrences of a new recipient with a relative probability in that range (e.g., 0.25) and the amount of the transaction is 20,000 or more. As shown for example in FIG. 6, the curve 530 decreases rather quickly until it reaches a point is called the elbow 540, and decreases more slowly after that.
3) Select risk values so that they are low for amounts to the left of the elbow and high for amounts to the right of the elbow
4) This allows the generation of an ABA risk score as a function of dollar amount for each bin or partition.
5) Apply two constraints. First, for a given amount, the ABA risk score should be decreasing as a function of the partition values. Specifically, for a given amount A, if the partition is [0.2, 0.3) then the risk should be higher for the same dollar amount for partition [0.4, 0.6). If this is not true, the risk curve is adjusted accordingly. Second, the expected number of alerts must fall within a specified alert budget. This can be accomplished, for example, by adjusting the identified position of the elbow. If too many alerts are expected, the elbow may for example be moved to the right. If too few alerts are expected, the elbow may be moved to the left, until the number of expected alerts matches the error budget.

Thus, the adjusted curve provides quantitative ABA risk values as a function of dollar amount, for the given tenant bank or sending bank and the given recipient bank. In an example a new recipient with an ABA relative probability of 0.25 and dollar amount of $100 may be assigned a very low risk score, whereas if the same transaction were for a dollar amount of $10,000, it may be assigned a substantial risk score. Similarly, if the ABA relative probability is 0.75 and the amount is $250,000, then a high risk score may be assigned, whereas the same transaction, for a dollar amount of $10,000, would be assigned a much lower risk.

These values can then be stored in the table ABA Risk Scores. It is noted that actual risk values may be tuned (e.g., in real time, near-real time, or otherwise) in the modeling process, as described below.

Figure 14:
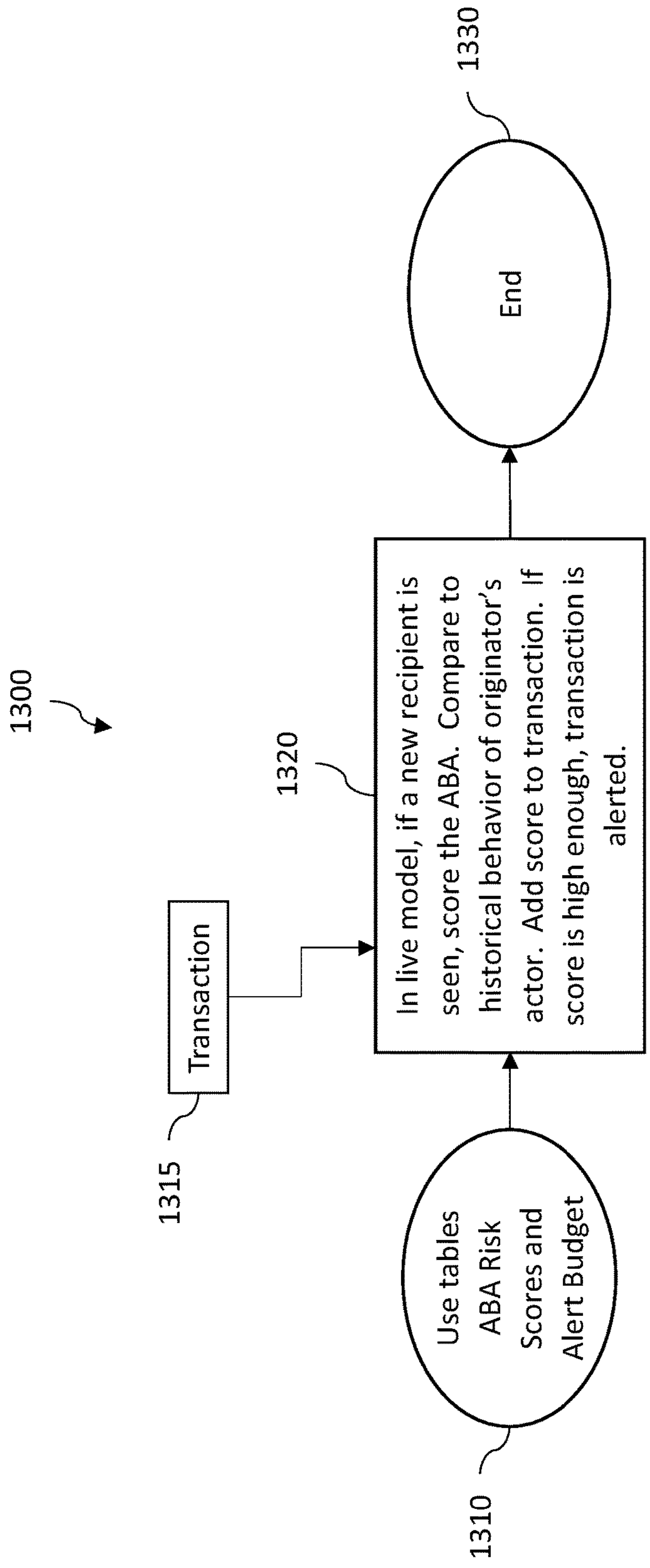
FIG. 14 is a schematic, diagrammatic representation, in flow diagram form, of an ABA risk modeling method, in accordance with at least one embodiment of the present disclosure.

FIG. 14 is a schematic, diagrammatic representation, in flow diagram form, of an ABA risk modeling method 1300, in accordance with at least one embodiment of the present disclosure. The preprocessing methods 800-1200 culminate in the generation or updating of the table (or tables) ABA Risk Scores. Method 1300 is directed to the real-time or near-real-time application of the ABA Risk Scores table to evaluate the risk of a given transaction 1315 between a given tenant bank and recipient bank.

In step 1310, the method 1300 includes receiving the tables ABA Risk Scores and Alert Budget from the database. The alert budget may for example be set by a human fraud analyst, and may be subject to change on a monthly, daily, or hourly basis, depending on available resources. In an example, the system may start with an alert budget for ABA transactions B of 0.05%, and the following partition table of ABA risk scores and amounts.

TABLE 1

| ABA Score | Amount |
|---|---|
| [0.0, 0.2,) | >=10000 |
| [0.2, 0.3,) | >=20000 |
| [0.3, 0.4,) | >=30000 |
| [0.4, 0.5,) | >=60000 |
| [0.5, 0.7,) | >=100000 |
| [0.7, 0.8,) | >=200000 |

It is noted that these partitions can be tweaked as needed.

In step 1320, the method includes using raw data to analyze the transaction 1315. For example, if a new recipient bank is seen, compute a risk score for the transaction based on the recipient ABA, and then compare it to historical behavior of the originator's actor (e.g., the sending account). If the risk score is high enough (e.g., above a threshold risk value), issue an alert for the transaction. The alert may for example include a visual or auditory cue to a fraud analyst and/or the execution of programmed responses (e.g., hold, block, etc.) according to policies set by the analyst. Example calculations may proceed according to the following pseudocode:

```
Receive a collection of transactions {Transactions}
For T in {Transactions}
Score an alert if the following is true
    The recipient has been known to the originator for less
      than 7 days
    The recipient is not on any trusted list
    The transaction is money going out
    The recipient ABA is in one of the ABA score bins and
      the amount of the transaction is less than the number
      in the amount column.
```

This originator does not have a propensity to send money to this ABA. For example, if the originator has sent money to 3 different recipients at this bank in the past 3 months, then do not alert. (The parameters here can be modified as needed).

In an example, the number of alerts in the last 2 months of data is calculated. The % of alerted transactions is then compared to the desired budget B. If there are significantly too many alerted transactions, the amounts can be shifted downwards and the number of alerts recalculated. The resulting partition table can then be added to the model.

Figure 15:
FIG. 15 is a screen display for an example ABA risk assessment system, in accordance with at least one embodiment of the present disclosure.

FIG. 15 is a screen display 1400 for an example ABA risk assessment system, in accordance with at least one embodiment of the present disclosure. The screen display 1400 shows policies for putting holds on alerts, or taking other actions as appropriate. With the screen display 1400, the alerts can be set, edited, or deleted by the fraud analyst as needed. In an example, the fraud analyst can choose to hold all transactions/batches that have high risk or have a risk factor (such as ABA risk). If desired, this can be set to auto hold. The definition of the policies can be changed to increase/decrease the rate of transactions receiving a hold. For example, it might be ABA risk plus amount over 100 k.

The screen display 1400 includes a number of policies 1410, each with a name or identifier 1420, a product type 1430, a policy definition 1440 and an activity trigger 1450. Other fields may be used instead or in addition.

Setting policies related to ABA risk does not necessarily change the workflow for current risk analysis systems. The analyst can still search for alerted transactions, but now some will be alerted because of ABA risk, even in the absence of other risk factors. Similarly, the analyst can search for particular risk factors the same as before-only now one of the risk factors to choose will be ABA risk. The analyst can also set up policies based on risk factors—of which ABA risk may be one option. In this sense, the ABA risk assessment system can be incorporated rather seamlessly into existing fraud detection systems, with the primary difference being that it is believed that a higher percentage of frauds will be caught.

It is also noted that the system can include a learning capability, wherein periodic recalculation of the preprocessing steps can take new information into account. In an example, if a tenant bank begins doing business with an unusual bank, the ABA risk assessment system will learn that connection and stop alerting ABA risk for that tenant and that recipient bank.

Figure 16A:
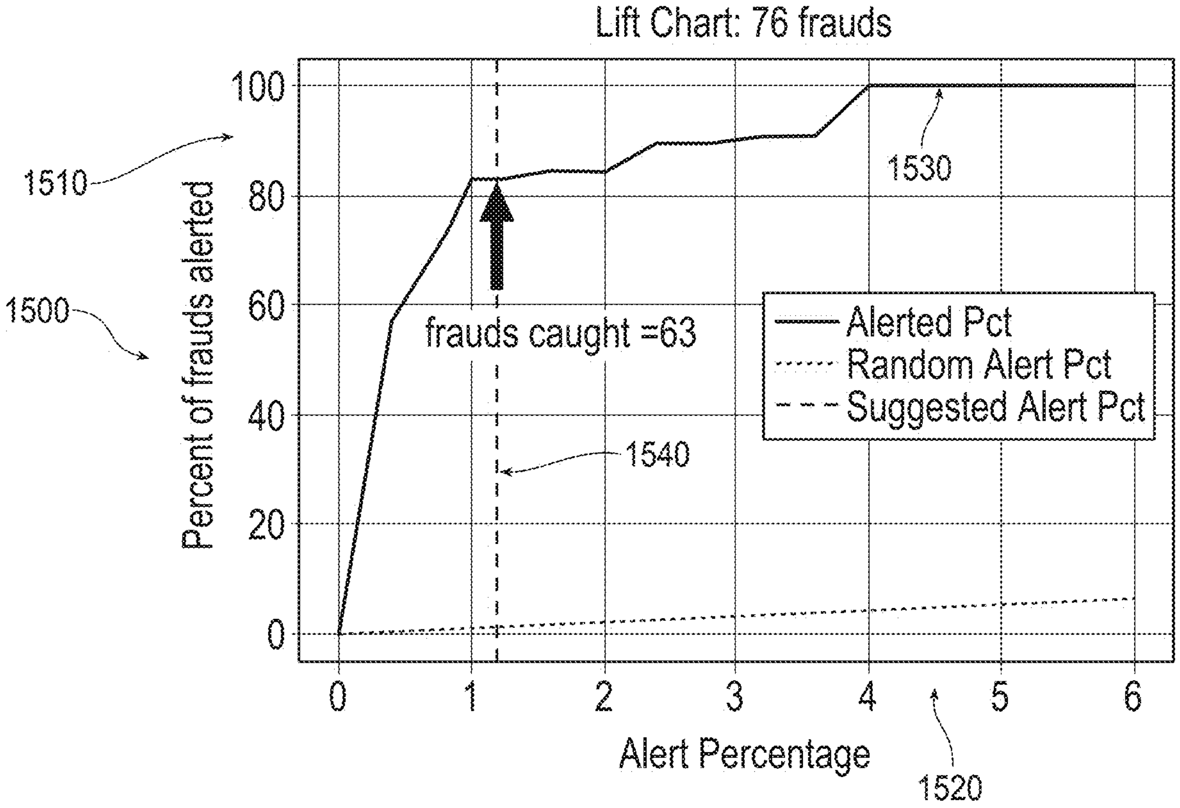
FIG. 16A is a lift chart for a baseline fraud management system that does not incorporate ABA risk assessment, in accordance with aspects of the present disclosure.

FIG. 16A is a lift chart 1500 for a baseline fraud management system that does not incorporate ABA risk assessment, in accordance with aspects of the present disclosure. The lift chart 1500 includes a Y-axis 1510 showing percent of frauds alerted, and an X-axis 1520 showing the percent of total transactions alerted. Also visible is a line 1530 showing the alert percentage, and a line 1540 showing an alert budget. As can be seen in the chart, with an alert budget of 1.2%, the number of frauds caught was 63, out of a total of 76 actual frauds, for a catch rate of 83%.

Figure 16B:
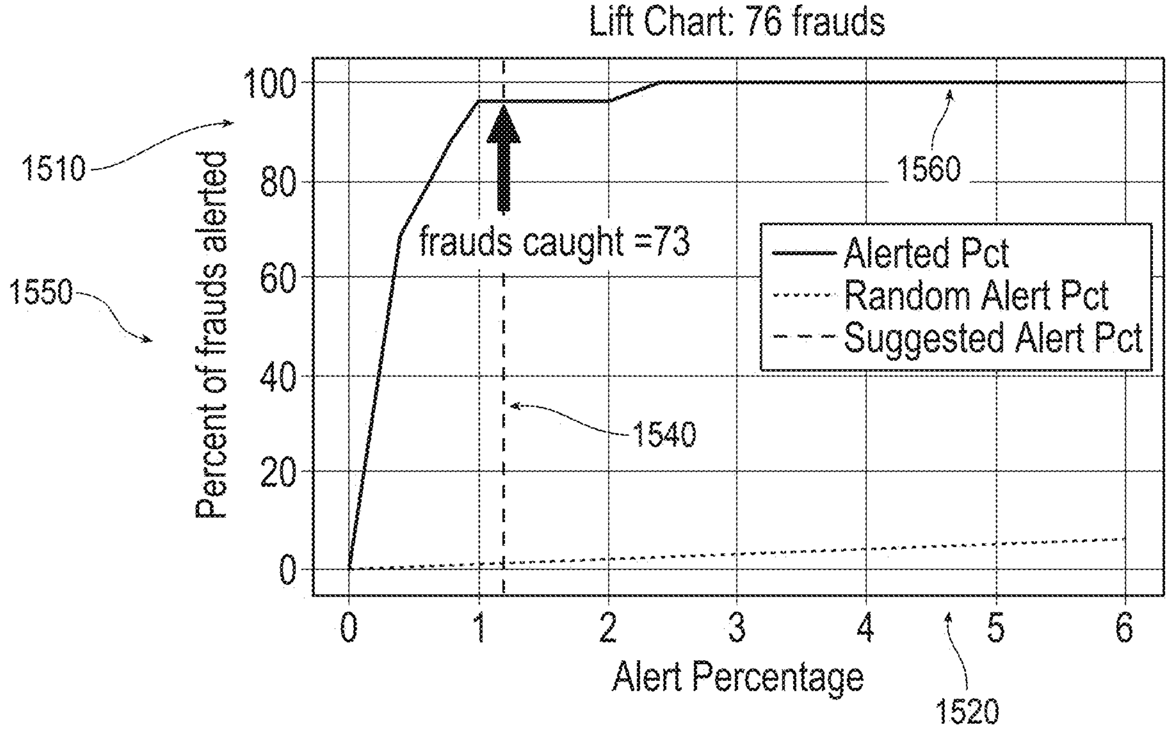
FIG. 16B is a lift chart for a fraud management system that incorporates the ABA risk assessment system, in accordance with at least one embodiment of the present disclosure.

FIG. 16B is a lift chart 1550 for a fraud management system that incorporates the ABA risk assessment system, in accordance with at least one embodiment of the present disclosure. The lift chart 1550 uses the same dataset, Y-axis 1510, X-axis 1520, and alert budget 1540. As can be seen from the alert percentage line 1560, with an alert budget of 1.2%, the number of frauds caught was 73, out of a total of 76 actual frauds, for a catch rate of 96%. Thus, it can be seen that the ABA risk assessment system provides a substantial advantage in fraud identification compared to existing systems.

Figure 17:
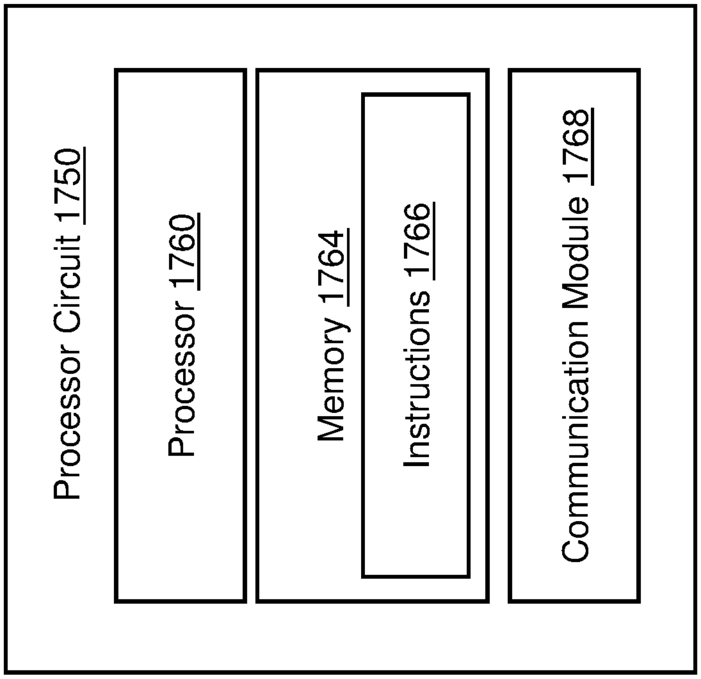
FIG. 17 is a schematic diagram of a processor circuit, in accordance with at least one embodiment of the present disclosure.

FIG. 17 is a schematic diagram of a processor circuit 1750, in accordance with at least one embodiment of the present disclosure. The processor circuit 1750 may be implemented in the ABA risk assessment system 60, the sending institution computer 20, the receiving institution computer 50, or other devices or workstations (e.g., third-party workstations, network routers, etc.), or on a cloud processor or other remote processing unit, as necessary to implement the method. As shown, the processor circuit 1750 may include a processor 1760, a memory 1764, and a communication module 1768. These elements may be in direct or indirect communication with each other, for example via one or more buses.

The processor 1760 may include a central processing unit (CPU), a digital signal processor (DSP), an ASIC, a controller, or any combination of general-purpose computing devices, reduced instruction set computing (RISC) devices, application-specific integrated circuits (ASICs), field programmable gate arrays (FPGAs), or other related logic devices, including mechanical and quantum computers. The processor 1760 may also include another hardware device, a firmware device, or any combination thereof configured to perform the operations described herein. The processor 1760 may also be implemented as a combination of computing devices, e.g., a combination of a DSP and a microprocessor, a plurality of microprocessors, one or more microprocessors in conjunction with a DSP core, or any other such configuration.

The memory 1764 may include a cache memory (e.g., a cache memory of the processor 1760), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an embodiment, the memory 1764 includes a non-transitory computer-readable medium. The memory 1764 may store instructions 1766. The instructions 1766 may include instructions that, when executed by the processor 1760, cause the processor 1760 to perform the operations described herein. Instructions 1766 may also be referred to as code. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The communication module 1768 can include any electronic circuitry and/or logic circuitry to facilitate direct or indirect communication of data between the processor circuit 1750, and other processors or devices. In that regard, the communication module 1768 can be an input/output (I/O) device. In some instances, the communication module 1768 facilitates direct or indirect communication between various elements of the processor circuit 1750 and/or the ABA risk assessment system 60. The communication module 1768 may communicate within the processor circuit 1750 through numerous methods or protocols. Serial communication protocols may include but are not limited to United States Serial Protocol Interface (US SPI), Inter-Integrated Circuit (I2C), Recommended Standard 232 (RS-232), RS-485, Controller Area Network (CAN), Ethernet, Aeronautical Radio, Incorporated 429 (ARINC 429), MODBUS, Military Standard 1553 (MIL-STD-1553), or any other suitable method or protocol. Parallel protocols include but are not limited to Industry Standard Architecture (ISA), Advanced Technology Attachment (ATA), Small Computer System Interface (SCSI), Peripheral Component Interconnect (PCI), Institute of Electrical and Electronics Engineers 488 (IEEE-488), IEEE-1284, and other suitable protocols. Where appropriate, serial and parallel communications may be bridged by a Universal Asynchronous Receiver Transmitter (UART), Universal Synchronous Receiver Transmitter (USART), or other appropriate subsystem.

External communication (including but not limited to software updates, firmware updates, preset sharing between the processor and a central server, etc. may be accomplished using any suitable wireless or wired communication technology, such as a cable interface such as a universal serial bus (USB), micro USB, Lightning, or Fire Wire interface, Bluetooth, Wi-Fi, ZigBee, Li-Fi, or cellular data connections such as 2G/GSM (global system for mobiles), 3G/UMTS (universal mobile telecommunications system), 4G, long term evolution (LTE), WiMax, or 5G. For example, a Bluetooth Low Energy (BLE) radio can be used to establish connectivity with a cloud service, for transmission of data, and for receipt of software patches. The controller may be configured to communicate with a remote server, or a local device such as a laptop, tablet, or handheld device, or may include a display capable of showing status variables and other information. Information may also be transferred on physical media such as a USB flash drive or memory stick.

As will be readily appreciated by those having ordinary skill in the art after becoming familiar with the teachings herein, the ABA risk assessment system uses data that is already available to detect suspicious transaction activity that was previously undetectable, including but not limited to BEC fraud. Accordingly, it can be seen that the ABA risk assessment system fills a long-standing need in the art, by increasing the type and percentage of frauds that can be caught based on the transaction data.

A number of variations are possible on the examples and embodiments described above. For example, the system may be employed in countries other than the United States, and may be applied to systems other than the ACH network, including foreign baking systems, blockchains, and other systems (whether financial or otherwise) that use a number or other unique identifier to identify the sender and recipient of a transaction or data transfer. Other signals may be added to the ABA risk analysis, including for example the age of a bank, the proximity of a bank to major urban centers, the percentage of fraudulent transactions historically associated with the bank, etc.

Accordingly, the logical operations making up the embodiments of the technology described herein are referred to variously as operations, steps, objects, elements, components, or modules. Furthermore, it should be understood that these may occur or be performed or arranged in any order, unless explicitly claimed otherwise or a specific order is inherently necessitated by the claim language.

The ABA risk assessment system is detectable in the sense that if BEC frauds are being caught, and all signals other than the ABA routing number appear non-suspicious, then at least some aspects of the ABA risk assessment system must be in use.

It is noted that all directional references e.g., upper, lower, inner, outer, upward, downward, left, right, lateral, front, back, top, bottom, above, below, vertical, horizontal, clockwise, counterclockwise, proximal, and distal are only used for identification purposes to aid the reader's understanding of the claimed subject matter, and do not create limitations, particularly as to the position, orientation, or use of the ABA risk assessment system. Connection references, e.g., attached, coupled, connected, joined, or "in communication with" are to be construed broadly and may include intermediate members between a collection of elements and relative movement between elements unless otherwise indicated. As such, connection references do not necessarily imply that two elements are directly connected and in fixed relation to each other. The term "or" shall be interpreted to mean "and/or" rather than "exclusive or." The word "comprising" does not exclude other elements or steps, and the indefinite article "a" or "an" does not exclude a plurality. Unless otherwise noted in the claims, stated values shall be interpreted as illustrative only and shall not be taken to be limiting.

The above specification, examples and data provide a complete description of the structure and use of exemplary embodiments of the ABA risk assessment system as defined in the claims. Although various embodiments of the claimed subject matter have been described above with a certain degree of particularity, or with reference to one or more individual embodiments, those of ordinary skill in the art could make numerous alterations to the disclosed embodiments without departing from the spirit or scope of the claimed subject matter.

Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A system adapted to automatically determine a risk level of a transaction based on the transaction's routing number, the system comprising:

a sending tenant institution processor and a first non-transitory computer readable medium operably coupled thereto, the first non-transitory computer readable medium comprising a first plurality of instructions stored in association therewith that are accessed and executed by the sending tenant institution processor, to perform first operations which comprise:

sending, to a routing number risk assessment processor, a list of routing numbers, each associated with a respective institution of a plurality of institutions;

sending, to the routing number risk assessment processor, a first group of transactions, wherein each transaction of the first group of transactions comprises a dollar amount, a respective sending tenant institution from the plurality of institutions, and a respective routing number of a receiving second institution from the list of routing numbers, and wherein some transactions of the first group of transactions are legitimate and some transactions of the first group of transactions are fraudulent;

receiving a real-time transaction; and sending the real-time transaction to the routing number risk assessment processor; and the routing number risk assessment processor and a second non-transitory computer readable medium operably coupled thereto, the routing number risk assessment processor communicatively coupled to the universe of tenant institution processors, and wherein the routing number risk assessment processor includes respective risk curves for each tenant institution of the universe of tenant institution processors, the second non-transitory computer readable medium comprising a plurality of instructions stored in association therewith that are accessed and executed by the routing number risk assessment processor, to perform second operations which comprise:

receiving, from the sending tenant institution processor, the list of routing numbers;

receiving, from the sending tenant institution processor, the first group of transactions;

for each respective routing number on the list of routing numbers, based on the legitimate transactions of the first group of transactions:

determining a transaction volume associated with the routing number;

determining a probability of a legitimate transaction being sent from the respective sending tenant institution to other routing numbers on the list of routing numbers; and for each of the respective other routing numbers on the list of routing numbers, based on the transaction volume associated with the respective other routing numbers, pre-computing a risk curve for transactions from the respective sending tenant institution routing number to the respective other routing numbers based on a dollar amount and the probability of a legitimate transaction being sent from the respective sending tenant institution to the respective other routing numbers; and receiving the real-time transaction from the sending tenant institution processor;

computing a risk score for the real-time transaction based on a dollar amount of the real-time transaction and the respective pre-computed risk curve for transactions from the respective sending tenant institution routing number associated with the real-time transaction to the receiving routing number associated with the real-time transaction; and transmitting the risk score to the sending tenant institution processor;

wherein the first operations performed by the sending institution processor further comprise:

receiving the risk score from the routing number risk assessment processor;

based on the risk score exceeding a threshold value, generating an alert for the real-time transaction; and based on the alert being generated, holding or blocking the real-time transaction from being transferred to a receiving institution computer.

2. The system of claim 1, wherein the second operations further comprise:

for each routing number on the list of routing numbers, based at least on the legitimate transactions of the first group of transactions, determining a geographic region of the routing number; and for each routing number on the list of routing numbers, treating the routing number as a sending tenant institution and each other routing number on the list of routing numbers as a receiving second institution:

for each receiving second institution, based on the transaction volume associated with the receiving second institution and the geographic region of the receiving second institution, pre-computing the risk curve for transactions from that sending tenant institution routing number to the receiving second institution routing number based on dollar amount and the probability of a legitimate transaction being sent from that sending tenant institution routing number to that receiving second institution routing number.

3. The system of claim 1, wherein the second operations further comprise:

receiving a second group of transactions; and for each routing number on the list of routing numbers, based on legitimate transactions of the second group of transactions, updating the transaction volume associated with the routing number;

treating the routing number as a sending tenant institution; and treating each other routing number on the list of routing numbers as a receiving second institution:

updating the probability of a legitimate transaction being sent from the sending tenant institution routing number to the receiving second institution routing number; and for the receiving second institution, based on the transaction volume associated with the receiving institution, updating the risk curve for transactions from the sending tenant institution routing number to the receiving second institution routing number based on dollar amount and the probability of a legitimate transaction being sent from the sending tenant institution routing number to the receiving second institution routing number.

4. The system of claim 1, wherein each transaction of the first group of transactions further comprises a flag indicating whether the transaction is a payroll transaction or a non-payroll transaction, and wherein the risk curves are determined separately for payroll transactions and non-payroll transactions.

5. The system of claim 1, wherein the first operations further comprise:

determining whether the routing number of the real-time transaction is present in the list of routing numbers; and generating the alert based on the routing number of the real-time transaction not being present on the list of routing numbers.

6. The system of claim 1, wherein the first operations further comprise:

comparing the probability of a legitimate transaction being sent from the sending tenant institution routing number of the real-time transaction to the receiving second institution routing number of the real-time transaction and a threshold value; and generating the alert based on the probability of a legitimate transaction being sent from the sending tenant institution routing number of the real-time transaction to the receiving second institution routing number of the real-time transaction being below the threshold value.

7. The system of claim 1, wherein the real-time transaction is part of a plurality of transactions from the same sending tenant institution routing number to the same receiving second institution routing number, and the alert generated for the real-time transaction indicates a risk level of the plurality of transactions.

8. The system of claim 1, wherein the second operations further comprise:

determining whether the real-time transaction is fraudulent, wherein, based on the real-time transaction being fraudulent, the performing of the second operations by the routing number risk assessment processor improves a probability of a fraud detection system detecting that the real-time transaction is fraudulent.

9. The system of claim 1, wherein the first operations further comprise, for each transaction in the first group of transactions:

determining whether the transaction is fraudulent; and based on the transaction being fraudulent, issuing a hold or warning message for the transaction.

10. The system of claim 1, wherein for a new transaction from the respective sending tenant institution, a risk score is computed by the routing number risk assessment processor based on a dollar amount and routing number of the new transaction.

11. A computer-implemented method adapted to automatically determine a risk level of a transaction based on the transaction's routing number, which method comprises, with a sending tenant institution processor and a first non-transitory computer readable medium operably coupled thereto, the first non-transitory computer readable medium comprising a first plurality of instructions stored in association therewith that are accessed and executed by the sending tenant institution processor, performing first operations which comprise:

sending, to a routing number risk assessment processor, a list of routing numbers, each associated with a respective institution of a plurality of institutions;

sending, to the routing number risk assessment processor, a first group of transactions, wherein each transaction of the first group of transactions comprises a dollar amount, a respective sending tenant institution from the plurality of institutions, and a respective routing number of a receiving second institution from the list of routing numbers, and wherein some transactions of the first group of transactions are legitimate and some transactions of the first group of transactions are fraudulent;

receiving a real-time transaction; and sending the real-time transaction to the routing number risk assessment processor; and with the routing number risk assessment processor and a second non-transitory computer readable medium operably coupled thereto, the routing number risk assessment processor communicatively coupled to the universe of tenant institution processors, and wherein the routing number risk assessment processor includes respective risk curves for each tenant institution of the universe of tenant institution processors, the second non-transitory computer readable medium comprising a second plurality of instructions stored in association therewith that are accessed and executed by the processor, performing second operations which comprise:

receiving, from the sending tenant institution processor, the list of routing numbers;

receiving, from the sending tenant institution processor, a first group of transactions;

for each respective routing number on the list of routing numbers, based on the legitimate transactions of the first group of transactions;

determining a transaction volume associated with the routing number;

determining a probability of a legitimate transaction being sent from the respective sending tenant institution to other routing numbers on the list of routing numbers; and for each of the respective other routing numbers on the list of routing numbers, based on the transaction volume associated with the respective other routing numbers, pre-computing a risk curve for transactions from the respective sending tenant institution routing number to the respective other routing numbers based on a dollar amount and the probability of a legitimate transaction being sent from the respective sending tenant institution routing number to the respective other routing numbers;

receiving the real-time transaction from the sending tenant institution processor;

computing a risk score for the real-time transaction based on a dollar amount of the real-time transaction and the respective pre-computed risk curve for transactions from the respective sending tenant institution routing number associated with the real-time transaction to the receiving routing number associated with the real-time transaction; and transmitting the risk score to the sending tenant institution processor;

wherein the first operations performed by the sending institution processor further comprise:

receiving the risk score from the routing number risk assessment processor;

based on the risk score exceeding a threshold value, generating an alert for the real-time transaction; and based on the alert being generated, holding or blocking the real-time transaction from being transferred to a receiving institution computer.

12. The method of claim 11, wherein the second operations further comprise:

for each routing number on the list of routing numbers, based at least on the legitimate transactions of the first group of transactions, determining a geographic region of the institution associated with the routing number; and for each routing number on the list of routing numbers, treating the routing number as a sending tenant institution and each other routing number on the list of routing numbers as a receiving second institution:

for each receiving second institution, based on the transaction volume associated with the receiving second institution and the geographic region of the receiving second institution, pre-computing the risk curve for transactions from that sending tenant institution to the receiving second institution based on dollar amount and the probability of a legitimate transaction being sent from that sending tenant institution routing number to that receiving institution routing number.

13. The method of claim 11, wherein the second operations further comprise:

receiving a second group of transactions; and for each routing number on the list of routing numbers, based on legitimate transactions of the second group of transactions, updating the transaction volume associated with the routing number;

treating the routing number as a sending tenant institution; and treating each other routing number on the list of routing numbers as a receiving second institution:

updating the probability of a legitimate transaction being sent from the sending tenant institution routing number to the receiving second institution routing number; and for the receiving second institution, based on the transaction volume associated with the receiving institution, updating the risk curve for transactions from the sending tenant institution routing number to the receiving second institution routing number based on dollar amount and the probability of a legitimate transaction being sent from the sending tenant institution routing number to the receiving second institution routing number.

14. The method of claim 11, wherein each transaction of the first group of transactions is further selected to comprise a flag indicating whether the transaction is a payroll transaction or a non-payroll transaction, and wherein the determining of the risk curves is conducted separately for payroll transactions and non-payroll transactions.

15. The method of claim 11, wherein the first operations further comprise:

determining whether the routing number of the real-time transaction is present in the list of routing numbers; and generating the alert based on the routing number of the real-time transaction not being present on the list of routing numbers.

16. The method of claim 11, wherein the first operations further comprise:

comparing the probability of a legitimate transaction being sent from the sending tenant institution routing number of the real-time transaction to the receiving second institution routing number of the real-time transaction and a threshold value; and generating the alert based on the probability of a legitimate transaction being sent from the sending tenant institution routing number of the real-time transaction to the receiving second institution routing number of the real-time transaction being below the threshold value.

17. The method of claim 11, wherein the real-time transaction is selected from part of a plurality of transactions from the same sending tenant institution routing number to the same receiving second institution routing number, and the alert generated for the real-time transaction indicates a risk level of the plurality of transactions.

18. The method of claim 11, wherein the second operations further comprise:

determining whether the real-time transaction is fraudulent, wherein based on the real-time transaction being fraudulent, the routing number risk assessment processor improves a probability of a fraud detection system detecting that the real-time transaction is fraudulent.

19. The method of claim 11, wherein the first operations further comprise, for each transaction in the first group of transactions:

determining whether the transaction is fraudulent; and based on the transaction being fraudulent, issuing a hold or warning message for the transaction.

20. The method of claim 11, wherein for a new transaction from the respective sending tenant institution, a risk score is computed by the routing number risk assessment processor based on a dollar amount and routing number of the new transaction.

* * * * *